US008375323B2

(12) United States Patent
Yajima et al.

(10) Patent No.: US 8,375,323 B2
(45) Date of Patent: Feb. 12, 2013

(54) DISPLAY CONTROL DEVICE, STORAGE MEDIUM, AND INTEGRATED CIRCUIT

(75) Inventors: Hideaki Yajima, Osaka (JP); Hidehiko Sin, Osaka (JP); Satoshi Inami, Osaka (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/377,470

(22) PCT Filed: Oct. 3, 2007

(86) PCT No.: PCT/JP2007/069366
§ 371 (c)(1),
(2), (4) Date: Feb. 13, 2009

(87) PCT Pub. No.: WO2008/044574
PCT Pub. Date: Apr. 17, 2008

(65) Prior Publication Data
US 2010/0257465 A1 Oct. 7, 2010

(30) Foreign Application Priority Data
Oct. 13, 2006 (JP) ................................ 2006-280032

(51) Int. Cl.
*G06F 3/048* (2006.01)
*G06F 3/00* (2006.01)

(52) U.S. Cl. ........ 715/794; 715/759; 715/781; 715/783; 715/788

(58) Field of Classification Search .................. 715/759, 715/781, 783, 788, 794
See application file for complete search history.

(56) References Cited

U.S. PATENT DOCUMENTS 6,031,530 A * 2/2000 Trueblood ................... 715/791
7,945,857 B2 * 5/2011 Deutscher et al. ............. 715/725
8,191,008 B2 * 5/2012 Ramnani ........................ 715/788

(Continued)

FOREIGN PATENT DOCUMENTS

JP 5-2382 1/1993
JP 2787833 6/1998

(Continued)

OTHER PUBLICATIONS

International Search Report issued Nov. 20, 2007 in the International (PCT) Application PCT/JP2007/069366 of which the present application is the U.S. National Stage.

*Primary Examiner* — Kieu Vu
*Assistant Examiner* — James T Durkin
(74) *Attorney, Agent, or Firm* — Wenderoth, Lind & Ponack, L.L.P.

(57) ABSTRACT

A device including an update request section making an update request to update a display on a display device, and a display update section updating the display on the display device in response to the update request. In addition, the device includes a layout holding section holding layout information of each of screens hierarchically displayed on the display device, and a group assigning section, based on the layout information, assigning screens, which are displayed on the display device so as to be partially or entirely visible, to one group. The device also includes a group holding section holding group information consisting of the assigned group, and a switching request section for making a list display request to display a switching destination screen candidate list, which shows the screens included in the held group information as switching destination screen candidates in a group unit, on the display device so as to be visible.

8 Claims, 23 Drawing Sheets

U.S. PATENT DOCUMENTS

| | | |
|---|---|---|
| 2004/0066414 A1 | 4/2004 | Czerwinski et al. |
| 2004/0261037 A1* | 12/2004 | Ording et al. .................. 715/788 |
| 2005/0125742 A1* | 6/2005 | Grotjohn et al. ............... 715/799 |
| 2006/0161847 A1* | 7/2006 | Holecek et al. ................ 715/716 |
| 2006/0161861 A1* | 7/2006 | Holecek et al. ................ 715/782 |
| 2006/0206825 A1* | 9/2006 | Dorn et al. ..................... 715/761 |
| 2007/0079252 A1* | 4/2007 | Ramnani ........................ 715/781 |
| 2008/0034317 A1* | 2/2008 | Fard et al. ...................... 715/781 |

FOREIGN PATENT DOCUMENTS

| | | | |
|---|---|---|---|
| JP | 11-085443 | | 3/1999 |
| JP | 11-85443 A | * | 3/1999 |
| JP | 2004-280777 | | 10/2004 |
| JP | 2005-084699 | | 3/2005 |
| JP | 2005-84699 A | * | 3/2005 |

* cited by examiner

FIG. 2

LAYOUT INFORMATION

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 3 |
| SCREEN B | 0 | 50 | 100 | 50 | 2 |
| SCREEN C | 0 | 0 | 100 | 100 | 1 |

FIG. 3

GROUP INFORMATION

| GROUP IDENTIFIER | BELONGING SCREEN IDENTIFIER |
|---|---|
| GROUP 1 | SCREEN A, SCREEN B |
| GROUP 2 | SCREEN C |

F I G. 6
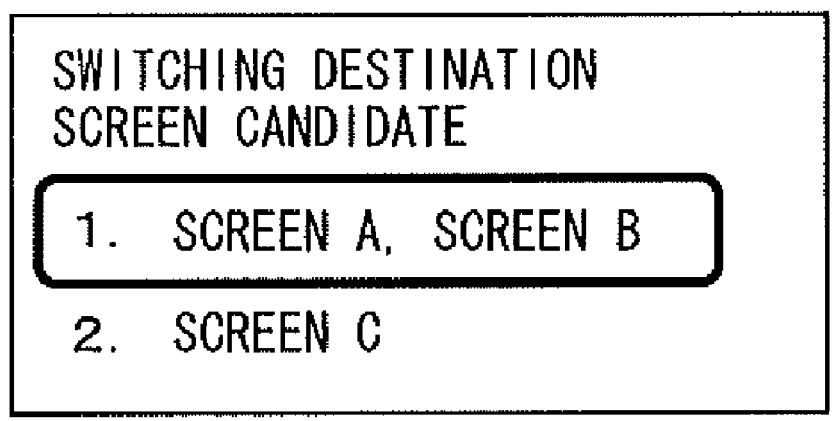

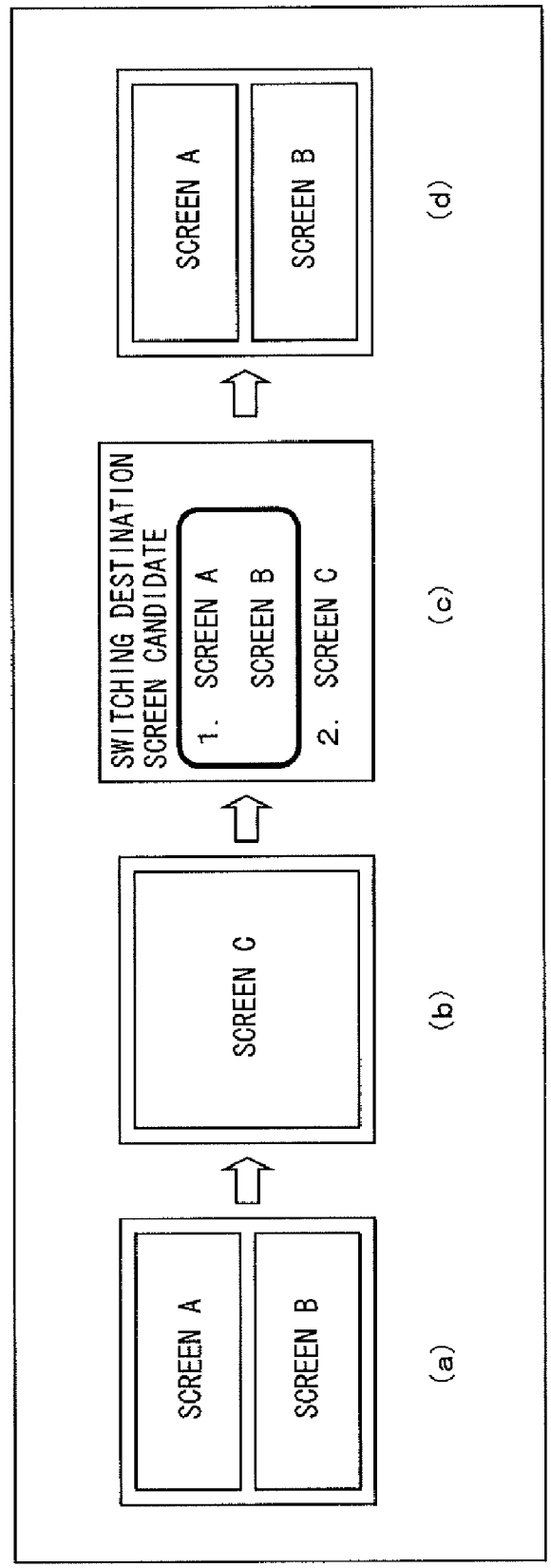

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 2 |
| SCREEN B | 0 | 50 | 100 | 50 | 1 |

(b)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 3 |
| SCREEN B | 0 | 50 | 100 | 50 | 2 |
| SCREEN C | 0 | 0 | 100 | 100 | 1 |

(c)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 3 |
| SCREEN B | 0 | 50 | 100 | 50 | 2 |
| SCREEN C | 0 | 0 | 100 | 100 | 1 |

(d)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 2 |
| SCREEN B | 0 | 50 | 100 | 50 | 1 |
| SCREEN C | 0 | 0 | 100 | 100 | 3 |

FIG. 11

| | GROUP IDENTIFIER | BELONGING SCREEN IDENTIFIER |
|---|---|---|
| (a) | GROUP 1 | SCREEN A, SCREEN B |

| | GROUP IDENTIFIER | BELONGING SCREEN IDENTIFIER |
|---|---|---|
| (b) | GROUP 1 | SCREEN A, SCREEN B |
| | GROUP 2 | SCREEN C |

| | GROUP IDENTIFIER | BELONGING SCREEN IDENTIFIER |
|---|---|---|
| (c) | GROUP 1 | SCREEN A, SCREEN B |
| | GROUP 2 | SCREEN C |

| | GROUP IDENTIFIER | BELONGING SCREEN IDENTIFIER |
|---|---|---|
| (d) | GROUP 1 | SCREEN A, SCREEN B |
| | GROUP 2 | SCREEN C |

F I G. 1 2
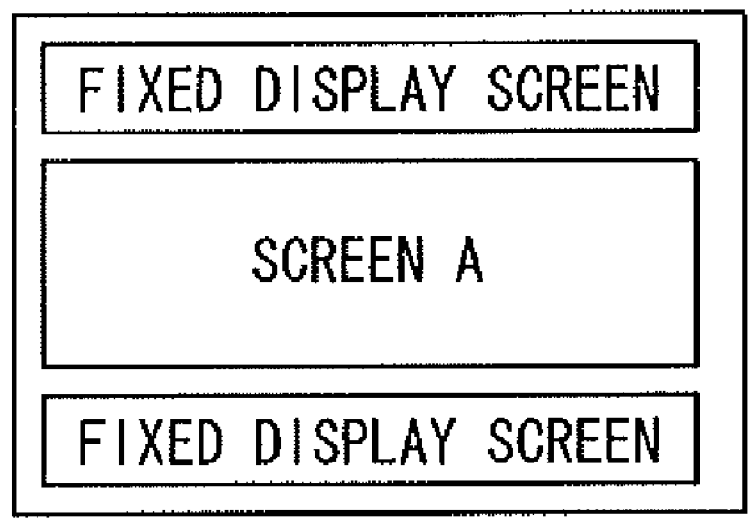

F I G. 17

| SCREEN IDENTIFIER | X-COORDINATE | Y-COORDINATE | WIDTH | HEIGHT | DISPLAY ORDER |
|---|---|---|---|---|---|
| SCREEN H | 0 | 0 | 100 | 100 | 6 |
| SCREEN I | 0 | 0 | 100 | 100 | 5 |
| SCREEN J | 0 | 0 | 100 | 50 | 4 |
| SCREEN K | 0 | 50 | 100 | 50 | 3 |
| SCREEN L | 0 | 0 | 100 | 50 | 2 |
| SCREEN M | 0 | 50 | 100 | 50 | 1 |

F I G. 1 8

(a)

| GROUP IDENTIFIER | BELONGING SCREEN IDENTIFIER |
|---|---|
| GROUP 1 | SCREEN H |
| GROUP 2 | SCREEN I |
| GROUP 3 | SCREEN J, SCREEN K |
| GROUP 4 | SCREEN L, SCREEN M |

(b)

| GROUP IDENTIFIER | BELONGING SCREEN IDENTIFIER |
|---|---|
| GROUP 1 | SCREEN H |
| GROUP 2 | SCREEN I |
| GROUP 3 | SCREEN J, SCREEN K |
| GROUP 4 | SCREEN L, SCREEN M |
| GROUP 5 | SCREEN J, SCREEN M |
| GROUP 6 | SCREEN L, SCREEN K |

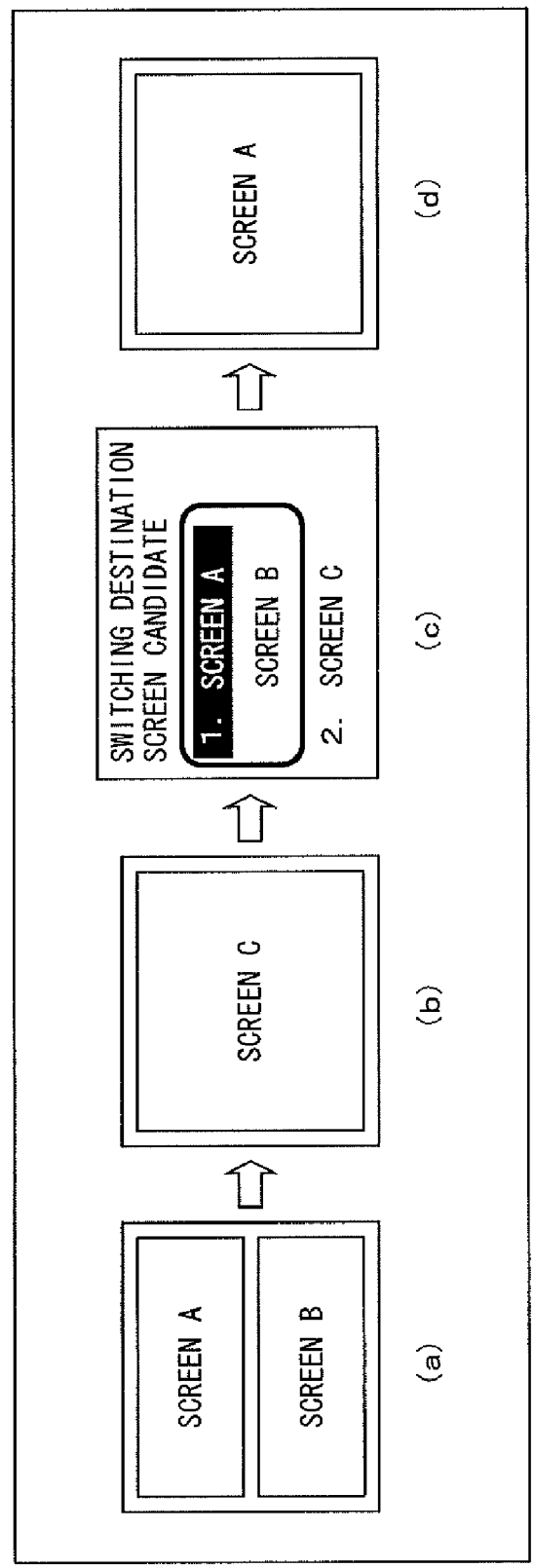

F I G. 23

(a)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 2 |
| SCREEN B | 0 | 50 | 100 | 50 | 1 |

(b)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 3 |
| SCREEN B | 0 | 50 | 100 | 50 | 2 |
| SCREEN C | 0 | 0 | 100 | 100 | 1 |

(c)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 50 | 3 |
| SCREEN B | 0 | 50 | 100 | 50 | 2 |
| SCREEN C | 0 | 0 | 100 | 100 | 1 |

(d)

| SCREEN IDENTIFIER | X-COORDINATE | Y-COORDINATE | WIDTH | HEIGHT | DISPLAY ORDER |
|---|---|---|---|---|---|
| SCREEN A | 0 | 0 | 100 | 100 | 1 |
| SCREEN B | 0 | 0 | 100 | 100 | 2 |
| SCREEN C | 0 | 0 | 100 | 100 | 3 |

FIG. 24

(a)
| GROUP IDENTIFIER | BELONGING SCREEN IDENTIFIER |
|---|---|
| GROUP 1 | SCREEN A, SCREEN B |

(b)
| GROUP IDENTIFIER | BELONGING SCREEN IDENTIFIER |
|---|---|
| GROUP 1 | SCREEN A, SCREEN B |
| GROUP 2 | SCREEN C |

(c)
| GROUP IDENTIFIER | BELONGING SCREEN IDENTIFIER |
|---|---|
| GROUP 1 | SCREEN A, SCREEN B |
| GROUP 2 | SCREEN C |

(d)
| GROUP IDENTIFIER | BELONGING SCREEN IDENTIFIER |
|---|---|
| GROUP 2 | SCREEN C |
| GROUP 3 | SCREEN A |
| GROUP 4 | SCREEN B |

DISPLAY CONTROL DEVICE, STORAGE MEDIUM, AND INTEGRATED CIRCUIT

TECHNICAL FIELD

The present invention relates to a display control device, a display control method, a program, and an integrated circuit, and more particularly, to a display control device, a display control method, a program, and an integrated circuit which are capable of causing a plurality of screens to be displayed hierarchically by controlling a display device.

BACKGROUND ART

Conventionally, information apparatuses such as personal computers, workstations, and mobile phones are provided with a system (multi-window system) which causes a plurality of screens (windows) to be hierarchically displayed on a display device such as a liquid crystal display and a CRT display. As such a multi-window system, there has been proposed a display control device which performs display switching processing for switching a display on a display device to a display desired by a user.

As an example of the display control device which performs display switching processing, there has been proposed a display control device in which a layout holding section (not shown) holds layout information of each hierarchically displayed screen when a user makes a holding request (e.g. refer to Patent Document 1). According to this display control device, in the case where the display on the display device is switched to the display when the holding request is made, the user refers to the layout information held in the layout holding section, and designates the screen which is displayed in the foreground of the display device when the holding request is made. The display control device re-displays each screen, which has been displayed hierarchically when the holding request is made, in accordance with the layout information of each screen including the designated screen. Thus, it is possible to switch the display on the display device to a display desired by the user.

Further, as another example of the display control device which performs display switching processing, there has been proposed a display control device in which a user is caused to designate a plurality of screens which are to be used together for switching a display thereto, the designated plurality of screens are assigned to one group to be iconified, and the icon is displayed on a display device (e.g. refer to Patent Document 2). According to this display control device, in the case where the display on the display device is switch to the plurality of screens designated by the user, the user selects the icon displayed on the display device. The display control device causes the plurality of screens assigned to the group of the selected icon to be displayed together. Thus, it is possible to switch the display on the display device to a display desired by the user.

[Patent Document 1] Japanese Patent Laid-open Publication No. 5-2382

[Patent Document 2] Japanese Patent No. 2787833

DISCLOSURE OF THE INVENTION

Problems to be Solved by the Invention

In the conventional display control device, however, in order to switch the display on the display device to the desired display, the user needs to make a holding request and to designate in advance a screen to be a switching target, or needs to designate a screen to be a switching target and to assign in advance the screen to one group. In other words, in order to switch the display on the display device to the desired display, the user needs to designate in advance a screen to be a switching target. Thus, when there is a plurality of screens to be switching targets, it is necessary to individually designate the screens to be the switching targets in advance, and hence the operation is complicated.

Further, in the display control device in which the user makes a holding request, the user refers to the layout information, and designates the screen which is displayed in the foreground of the display device when the holding request is made, thereby switching the display on the display device. Thus, when designating a screen, the user cannot know, at a glance, how each screen is to be actually displayed. In addition, in the conventional display control device which causes an icon to be displayed, when selecting an icon, the user cannot know, at a glance, how each screen is to be actually displayed.

An object of the present invention is to provide a display control device, for solving the above conventional problems, which is capable of switching a display on a display device to a display desired by a user, without a complicated operation, in a state where it is possible for the user to know a display state after switching at a glance.

Solution to the Problems

The present invention is for solving the above conventional problems, and a display control device according to the present invention is a display control device capable of causing a plurality of screens to be hierarchically displayed on a display device by controlling the display device. The display control device comprising: an update request section for making an update request for updating a display on the display device; a display update section for updating the display on the display device in response to the update request from the update request section; a layout holding section for, after update processing by the display update section, holding layout information of each of the screens hierarchically displayed on the display device; a group assigning section for referring to the layout information of each of the screens which is held in the layout holding section, and assigning screens which are displayed on the display device so as to be partially or entirely visible to one group; a group holding section for holding group information indicative of a correspondence between the group assigned by the group assigning section and the screens which belong to the group; and a switching request section for making a list display request for displaying a switching destination screen candidate list, which shows the screens included in the group information in the group holding section as switching destination screen candidates in a group unit, on the display device so as to be visible. In response to the list display request from the switching request section, the display update section further updates the display on the display device in accordance with the group information held in the group holding section such that the switching destination screen candidate list is displayed on the display device so as to be visible.

In the above configuration, the layout information of each screen is automatically held in accordance with the update processing by the display update section. Thus, even when a plurality of switching targets occur by the update processing, the user does not need to individually designate screens to be the switching targets, and an operation does not become complicated, thereby reducing the possibility of a wrong operation. In addition, by displaying the switching destination screen candidate list on the display device, it is possible to know not only a display state of a screen displayed in the foreground of the display device but also display states of a plurality of screens which are displayed on the display device so as to be partially or entirely visible. Thus, it is possible for the user to know a display state after switching at a glance. As described above, according to the above configuration, it is possible to switch the display on the display device to a display desired by the user, without a complicated operation, in a state where it is possible for the user to know a display state after switching at a glance.

Preferably, the display control device further comprises a group addition section for referring to the layout information of each of the screens which is held in the layout holding section, assigning to one group each combination of screens which is different from that in the group assigned by the group assigning section and capable of being displayed on the display device without overlapping with each other, and adding group information consisting of this assigned group to the group information held in the group holding section. Thus, it is possible for the user to know display states of screens, which have not been previously simultaneously displayed, after switching at a glance.

Preferably, the switching destination screen candidate list shows the screens included in the group information in the group holding section, so as to be selectable as the switching destination screen candidates in a group unit, the display control device further comprises a layout update section for, when one group is selected on the switching destination screen candidate list in accordance with a user's operation, updating the layout information held in the layout holding section such that all screens which belong to the one group are to be displayed on the display device so as to be visible, and in response to update processing by the layout update section, the display update section further updates the display on the display device in accordance with the layout information in the layout holding section which has been updated by the layout update section. Thus, it is possible to select a screen on the switching destination screen candidate list in a group unit, and it is possible to display all screens which belong to the selected group.

Preferably, the switching destination screen candidate list shows the screens included in the group information in the group holding section, so as to be selectable as the switching destination screen candidates in a screen unit, the display control device further comprises a layout update section for, when one screen is selected on the switching destination screen candidate list in accordance with a user's operation, updating the layout information held in the layout holding section such that the one screen is to be displayed in the foreground of the display device so as to be visible, and in response to update processing by the layout update section, the display update section further updates the display on the display device in accordance with the layout information in the layout holding section which has been updated by the layout update section. Thus, it is possible to select one screen on the switching destination screen candidate list, and it is possible to display only the selected display. In this case, it is preferable that the layout update section updates the layout information held in the layout holding section such that the one screen is to be displayed in the foreground of and across the entire display area of the display device. Thus, it is possible to enlarge the display size of the selected screen to the size of the display area of the display device and to display the selected screen. Further, in this case, it is preferable that the display control device further comprises a group update section for referring to the layout information in the layout holding section which has been updated by the layout update section, assigning screens which are to be displayed on the display device so as to be partially or entirely visible to one group, and updating the group information in the group holding section based on this assigned group. Thus, it is possible to easily change the group information already held in the group holding section.

Further, the present invention is directed to a display control method for solving the above conventional problems, and the display control method according to the present invention is a display control method used in a display control device capable of causing a plurality of screens to be hierarchically displayed on a display device by controlling the display device. The display control method comprises: an update request step of making an update request for updating a display on the display device; a first display update step of updating the display on the display device in response to the update request at the update request step; a layout holding section for, after update processing at the first display update step, causing the display control device to hold layout information of each of the screens hierarchically displayed on the display device; a group assigning step of referring to the layout information of each of the screens which is held in the display control device, and assigning screens which are displayed on the display device so as to be partially or entirely visible to one group; a group holding step of causing the display control device to hold group information indicative of a correspondence between the group assigned at the group assigning step and the screens which belong to the group; a switching request step of making a list display request for displaying a switching destination screen candidate list, which shows the screens included in the group information in the display control device as switching destination screen candidates in a group unit, on the display device so as to be visible; and a second display update step of, in response to the list display request at the switching request step, updating the display on the display device using the group information held in the display control device such that the switching destination screen candidate list is displayed on the display device so as to be visible.

Further, the present invention is directed to a program for solving the above conventional problems, and the program according to the present invention is a program to be executed by a computer capable of causing a plurality of screens to be hierarchically displayed on a display device by controlling the display device. The program causes the computer to execute: an update request step of making an update request for updating a display on the display device; a first display update step of updating the display on the display device in response to the update request at the update request step; a layout holding section for, after update processing at the first display update step, causing the computer to hold layout information of each of the screens hierarchically displayed on the display device; a group assigning step of referring to the layout information of each of the screens which is held in the computer, and assigning screens which are displayed on the display device so as to be partially or entirely visible to one group; a group holding step of causing the computer to hold group information indicative of a correspondence between the group assigned at the group assigning step and the screens which belong to the group; a switching request step of making a list display request for displaying a switching destination screen candidate list, which shows the screens included in the group information in the computer as switching destination screen candidates in a group unit, on the display device so as to be visible; and a second display update step of, in response to the list display request at the switching request step, updating the display on the display device using the group information held in the computer such that the switching destination screen candidate list is displayed on the display device so as to be visible.

Further, the present invention is directed to a integrated circuit for solving the above conventional problems, and the integrated circuit according to the present invention is an integrated circuit capable of causing a plurality of screens to be hierarchically displayed on a display device by controlling the display device. The integrated circuit comprises: an update request section for making an update request for updating a display on the display device; a display update section for updating the display on the display device in response to the update request from the update request section; a layout holding section for, after update processing by the display update section, holding layout information of each of the screens hierarchically displayed on the display device; a group assigning section for referring to the layout information of each of the screens which is held in the layout holding section, and assigning screens which are displayed on the display device so as to be partially or entirely visible to one group; a group holding section for holding group information indicative of a correspondence between the group assigned by the group assigning section and the screens which belong to the group; and a switching request section for making a list display request for displaying a switching destination screen candidate list, which shows the screens included in the group information in the group holding section as switching destination screen candidates in a group unit, on the display device so as to be visible. In response to the list display request from the switching request section, the display update section further updates the display on the display device in accordance with the group information held in the group holding section such that the switching destination screen candidate list is displayed on the display device so as to be visible.

Effect of the Invention

According to the present invention, a display control device, which is capable of switching a display on a display device to a display desired by a user, without a complicated operation, in a state where it is possible for the user to know a display state after switching at a glance, can be provided.

BRIEF DESCRIPTION OF THE DRAWINGS

FIG. 2 shows an example of layout information.

FIG. 3 shows an example of group information.

FIG. 6 shows a display example of the switching destination screen candidate list.

FIG. 9 illustrates a state where a display on a display device 300 is updated from (a) to (d).

FIG. 10 shows layout information in a layout holding section 103 corresponding to the displays (a) to (d) in FIG. 9, respectively.

FIG. 11 shows group information in a group holding section 106 corresponding to the displays (a) to (d) in FIG. 9, respectively.

FIG. 12 shows an example in which fixed display screens are displayed on the display device 300.

FIG. 17 shows layout information held in a layout holding section 103 in the display state of FIG. 16.

FIG. 18 shows group information held in a group holding section 106 in the display state of FIG. 16.

FIG. 22 illustrates a state where a display on a display device 300 is updated from (a) to (d).

FIG. 23 shows layout information in a layout holding section 103 corresponding to the displays (a) to (d) in FIG. 22, respectively.

FIG. 24 shows group information in a group holding section 106 corresponding to the displays (a) to (d) in FIG. 22, respectively.

Figure 1:
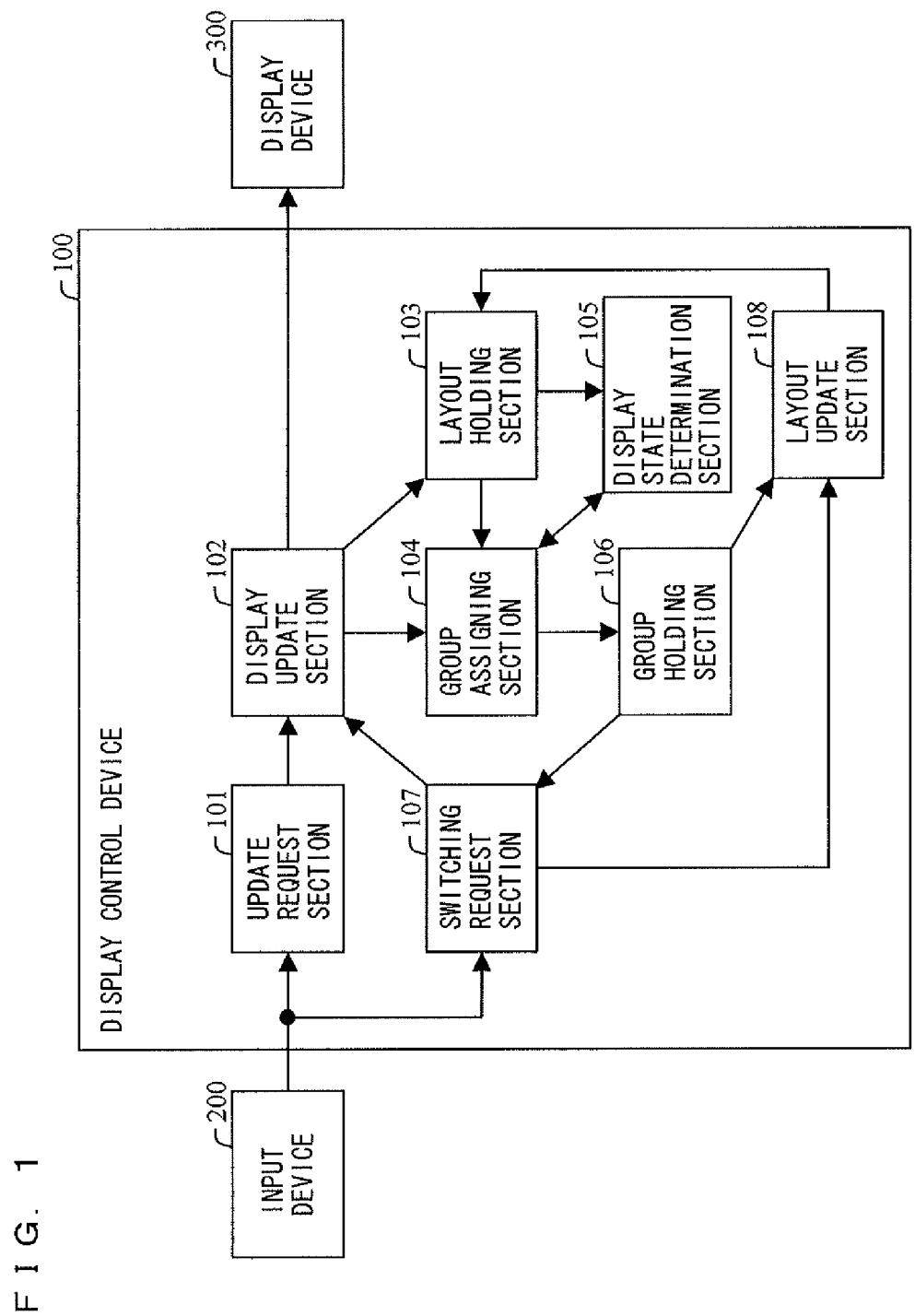
FIG. 1 is a block diagram showing a schematic configuration of a display control device 100 according to a first embodiment.

DESCRIPTION OF THE REFERENCE CHARACTERS 100, 100a, 100b display control device
101 update request section
102 display update section
103 layout holding section
104 group assigning section
105 display state determination section
106 group holding section
107 switching request section
108 layout update section
131 group addition section
171 group update section
200 input device
300 display device

BEST MODE FOR CARRYING OUT THE INVENTION

The following will describe embodiments of the present invention with reference to the figures.

First Embodiment

FIG. 1 is a block diagram showing a schematic configuration of a display control device 100 according to a first embodiment of the present invention.

As shown in FIG. 1, the display control device 100 is connected to an input device 200 and a display device 300. The input device 200 is a device, such as a key and a mouse, which is used for inputting a user's operation. The display device 300 is a device such as a CRT display and a liquid crystal display. The display control device 100 is a device which controls a display on the display device 300 in accordance with an input from the input device 200. The display control device 100 includes an update request section 101, a display update section 102, a layout holding section 103, a group assigning section 104, a display state determination section 105, a group holding section 106, a switching request section 107, and a layout update section 108.

The update request section 101 consists of, for example, an application, a task, and the like, and a user's operation is inputted thereto from the input device 200. When the inputted user's operation is indicative of a display update instruction, the update request section 101 makes an update request to the display update section 102 for updating the display on the display device 300. The display update instruction means an instruction to display a new screen, such as activation of an application. The update request includes layout information of each screen to be updated by the user's operation.

In response to the update request from the update request section 101, the display update section 102 causes the layout holding section 103 to hold the layout information of each screen which is included in the update request, and also updates the display on the display device 300 in accordance with the layout information held in the layout holding section 103. In addition, in response to the update request from the update request section 101, the display update section 102 makes a group assigning request to the group assigning section 104.

The layout holding section 103 holds the layout information of each screen. FIG. 2 shows an example of the layout information. As shown in FIG. 2, the layout information includes a screen identifier for identifying each screen, a display position (X-coordinate, Y-coordinate), a display size (width, height), and a display order of each screen.

In response to the group assigning request from the display update section 102, the group assigning section 104 makes a display state determination request to the display state determination section 105 for determining a display state of each screen included in the layout information in the layout holding section 103. The group assigning section 104 obtains the display state of each screen from the display state determination section 105, and assigns to one group only screens which are actually partially or entirely seen (visible) on the display device 300. The group assigning section 104 causes the group holding section 106 to hold group information consisting of the assigned group. The group information will be described in detail later.

In response to the display state determination request from the group assigning section 104, the display state determination section 105 determines overlapping of each screen based on the layout information (X- and Y-coordinates, width, height, display order) held in the layout holding section 103. Among each screen included in the layout information in the layout holding section 103, the display state determination section 105 determines a screen which is partially or entirely visible on the display device 300 as a visible screen, and determines a screen which is fully covered with another screen and invisible on the display device 300 as an invisible screen.

The group holding section 106 holds the group information. FIG. 3 shows an example of the group information. As shown in FIG. 3, the group information includes a group identifier for identifying each group, and an identifier for each screen belonging to each group (belonging screen identifier).

Figure 4:
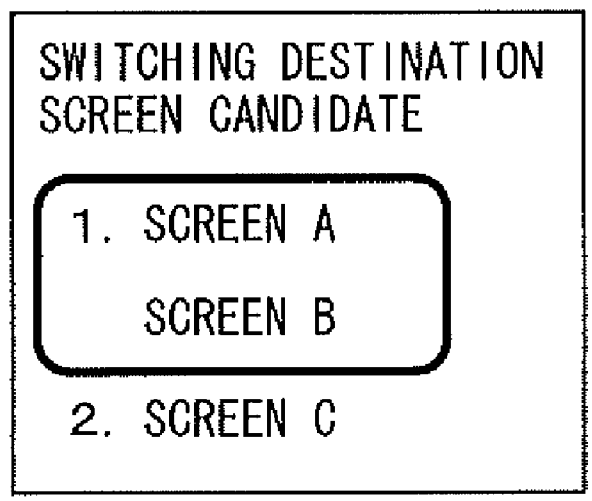
FIG. 4 shows a display example of a switching destination screen candidate list.
Figure 5:
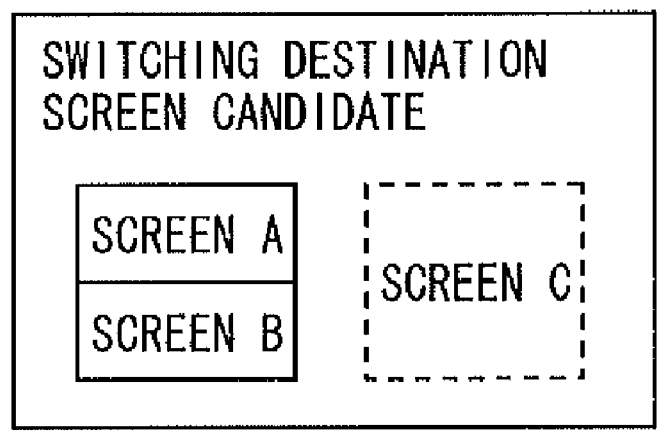
FIG. 5 shows a display example of the switching destination screen candidate list.

The user's operation is inputted from the input device 200 to the switching request section 107. When the inputted user's operation is indicative of a display switching instruction, the switching request section 107 obtains the group information held in the group holding section 106, and makes a list display request to the display update section 102 for displaying a switching destination screen candidate list. The display switching instruction means an instruction to re-display an already displayed screen. The list display request includes group information. FIGS. 4 to 6 show display examples of the switching destination screen candidate list. FIGS. 4 to 6 show display examples when the group information shown in FIG. 3 is held in the group holding section 106. In the switching destination screen candidate list of FIG. 4, a group 1 is surrounded by a solid frame. The user can select any one of the groups 1 and 2 by moving a selection range surrounded by the solid frame to any one of the groups 1 and 2 using the input device 200, and pressing a decision key. In the switching destination screen candidate list of FIG. 5, the layout of each screen appears. In addition, in the switching destination screen candidate list of FIG. 5, a group to be selected is surrounded by a solid line, and a group not to be selected is surrounded by a dotted line. The user can select any one of the groups 1 and 2 by surrounding any one of the groups 1 and 2 with a solid line using the input device 200, and pressing the decision key. In the switching destination screen candidate list of FIG. 6, similarly as in FIG. 4, the group 1 is surrounded by a solid frame. The user can select any one of the groups 1 and 2 by moving a selection range surrounded by the solid frame to any one of the groups 1 and 2 using the input device 200, and pressing the decision key. Thus, the switching destination screen candidate list is a list showing screens included in the group information as switching destination candidates in unit of group.

FIGS. 4 to 6 show examples in which the belonging screen identifiers (screens A to C) are displayed, but the present invention is not limited thereto. For example, a title of each screen, a name of the update request section 101, or the like may be displayed. The name of the update request section 101 is an application name or a task name if the update request section 101 consists of an application and a task. Alternatively, instead of a character string such as the belonging screen identifier and the title, an image such as an icon which directly represents the display content of each screen may be used. Further, in FIGS. 4 and 6, character colors, background colors, fonts, and the like, of the belonging screen identifier and the tile may be changed for each group. Further, in FIG. 5, in addition to the belonging screen identifier, a group name may be displayed.

Further, when the inputted user's operation is indicative of a group selection, the switching request section 107 makes a layout update request to the layout update section 108 for updating the layout information in the layout holding section 103, and makes a display switching request to the display update section 102.

In response to the layout update request from the switching request section 107, the layout update section 108 updates the layout information held in the layout holding section 103.

Figure 7:
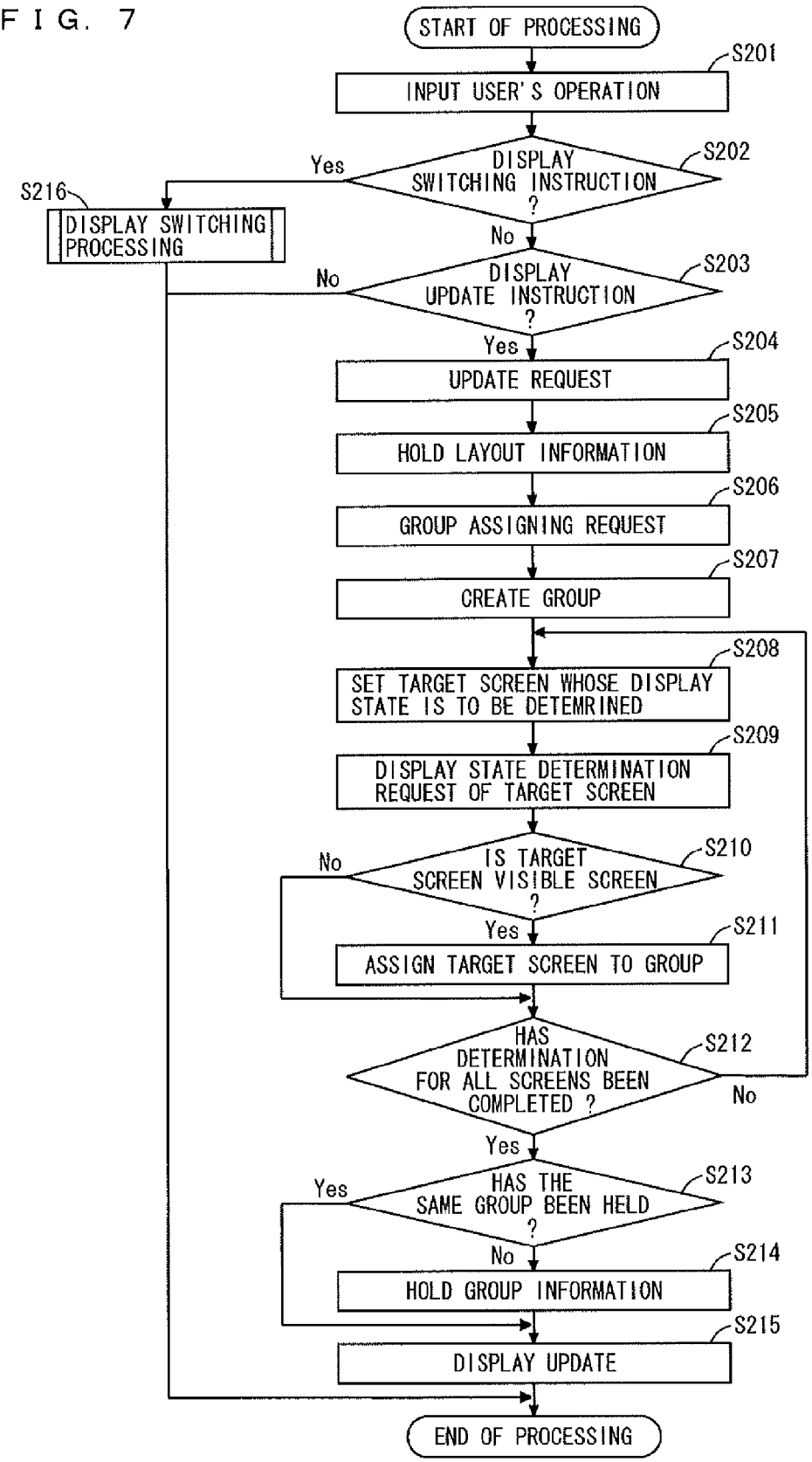
FIG. 7 is a flow chart showing control processing of the display control device 100 according to the first embodiment.
Figure 8:
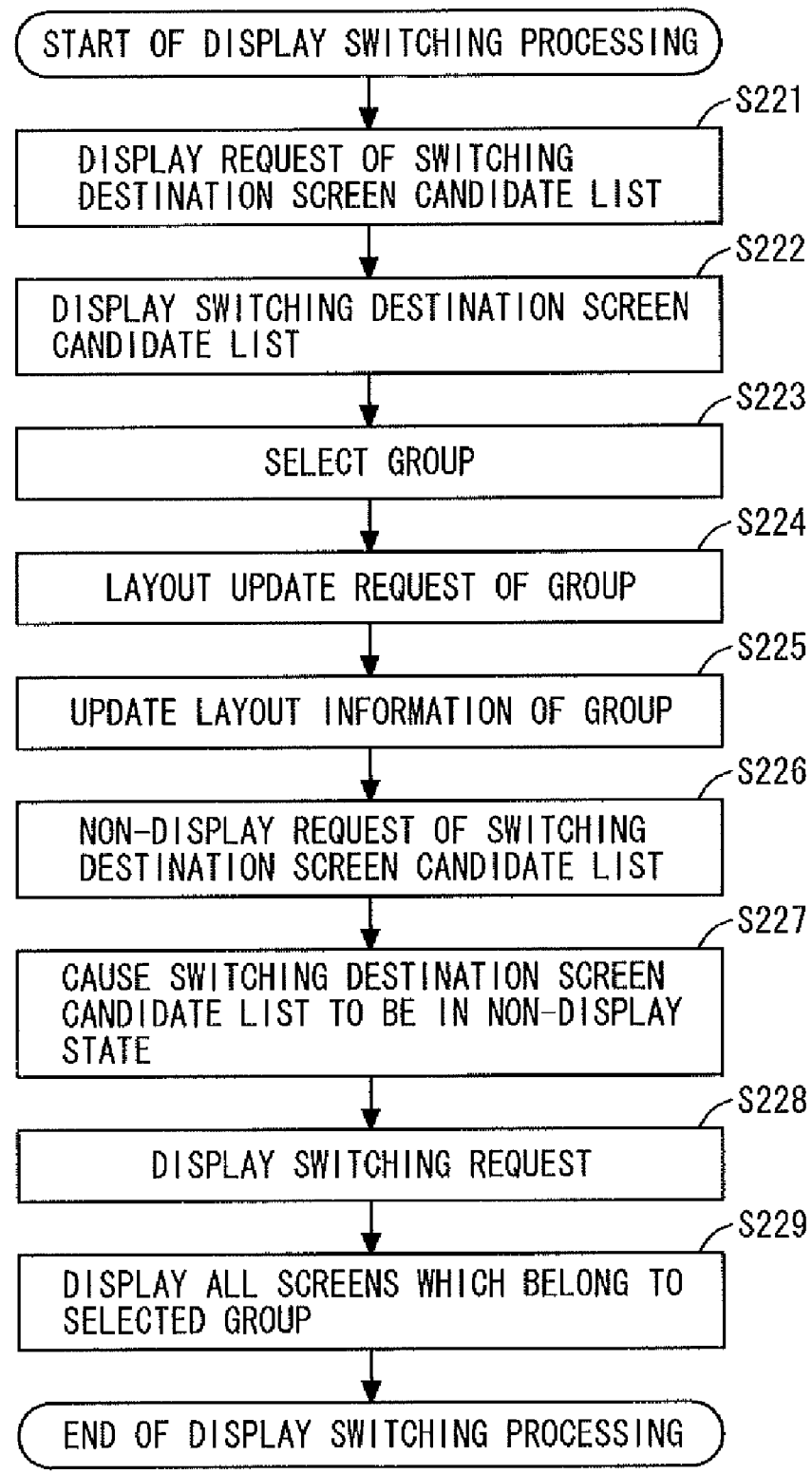
FIG. 8 is a flow chart showing in detail display switching processing in the control processing.

The following will describe a procedure of control processing of the display control device 100 according to the first embodiment of the present invention with reference to FIGS. 7 to 11. FIG. 7 is a flow chart showing the control processing of the display control device 100 according to the first embodiment. FIG. 8 is a flow chart showing in detail display switching processing in the control processing. FIG. 9 illustrates a state where the display on the display device 300 is updated from (a) to (d). FIG. 10 shows layout information in the layout holding section 103 corresponding to the displays (a) to (d) in FIG. 9, respectively. FIG. 11 shows group information in the group holding section 106 corresponding to the displays (a) to (d) in FIG. 9, respectively.

At an initial stage, the display device 300 is not started, and nothing is displayed on the display device 300. Thus, first, the user starts the display device 300 to display an initial screen (FIG. 9 (a)) on the display device 300. Specifically, in FIG. 7, the user performs an operation such as turning on a power switch of the input device 200 and pressing a start button of the input device 200, thereby inputting a user's operation indicative of a start request of the display device 300 (a step S201). The switching request section 107 determines whether or not the user's operation inputted at the step S201 is indicative of a display switching instruction (a step S202). Here, because the user's operation is indicative of the start request, it is determined at the step S202 that the user's operation is not indicative of a display switching instruction (NO at the step S202), the control processing proceeds to a step S203. At the step S203, the update request section 101 determines whether or not the user's operation inputted at the step S201 is indicative of a display update instruction. Here, because the user's operation is indicative of the start request, it is necessary to display the initial screen (FIG. 9 (a)) on the display device 300. Thus, the user's operation is indicative of a display update instruction (YES at the step S203), and the control processing proceeds to a step S204. On the other hand, when the user's operation is not indicative of a display update instruction (NO at the step S203), the control processing is ended. At the step S204, the update request section 101 makes an update request to the display update section 102 for updating the display on the display device 300 with the initial screen (FIG. 9 (a)). This update request includes layout information of the screens A and B which are used for the updating by the user's operation. Subsequent to the step S204, in response to the update request, the display update section 102 causes the layout holding section 103 to hold the layout information of each screen which is included in the update request (a step S205). Here, because the initial screen (FIG. 9 (a)) is displayed, the layout information shown in FIG. 10(a) is held in the layout holding section 103. In FIG. 10(a), the display order for the screen A is 2, and the display order for the screen B is 1. However, because the screens A and B do not overlap with each other in FIG. 9(a), the display order for the screen A may be 1, and the display order for the screen B may be 2.

Subsequent to the step S205, the display update section 102 makes a group assigning request to the group assigning section 104 (a step S206). In response to the group assigning request, the group assigning section 104 creates a new group to be an assigning target (a step S207). Here, the initially created new group is referred to a group 1.

Subsequent to the step S207, the group assigning section 104 sets one of a plurality of screens included in the layout information in the layout holding section 103 as a target screen whose display state is to be determined (a step S208). Here, the screen A held at the head of the layout holding section 103 is set as the target screen. Then, the group assigning section 104 makes a display state determination request to the display state determination section 105 for the target screen (a step S209). The display state determination section 105 determines overlapping of each screen based on the layout information (X- and Y-coordinate, width, height, display order) held in the layout holding section 103, and determines whether or not the target screen is a visible screen (a step S210). In the case of FIG. 9(a), because there are not other screens which fully cover the screen A, it is determined that the screen A is a visible screen. When the target screen is a visible screen (YES at the step S210), the group assigning section 104 assigns the target screen to the group created at the step S207 (a step S211). Then, the control processing proceeds to a step S212. On the other hand, when the target screen is an invisible screen (NO at the step S210), the processing at the step S211 is not executed, and the control processing proceeds to the step S212. Here, because the screen A is the visible screen, the screen A is assigned to the group 1 at the step S211. At the step S212, the group assigning section 104 determines whether or not the display state determination for all the screens included in the layout information in the layout holding section 103 has been completed (the step S212). When the determination for all the screens has been completed (YES at the step S212), the control processing proceeds to a step S213. On the other hand, when the determination for all the screens has not been completed (NO at the step S212), the control processing returns to the step S208, and the processing at the steps S208 to S212 are repeated until the determination for all the screens is completed. Here, as the screens included in the layout information in the layout holding section 103, the screen B remains except for the screen A. Thus, the processing returns to the step S208, and the screen B is set as a target screen at the step S208. Similarly as the screen A, the screen B is a visible screen (YES at the step S210). Thus, the screen B is assigned to the group 1 at the step S211. When the determination for all the screens (YES at the step S212) is completed, the group assigning section 104 determines whether or not a group consisting of the same screens as the currently created group has been already held in the group holding section 106 (a step S213). When a group having the same constitution as the currently created group has not been held in the group holding section 106 (NO at the step S213), the group holding section 106 is caused to hold group information consisting of the group created at the steps S207 to S212 (a step S214). On the other hand, when a group having the same constitution as the currently created group has not been held in the group holding section 106 (YES at the step S213), the holding processing at the step S214 is skipped to prevent double registration. Here, nothing has been held in the group holding section 106. Thus, at the step S213, it is determined that a group having the same constitution as the currently created group has not been held in the group holding section 106, and the group information of the group 1 shown in FIG. 11(a) is held in the group holding section 106 at the step S214. Subsequent to the step S214, the display update section 102 displays each screen on the display device 300 in accordance with the layout information held in the layout holding section 103 (a step S215), and then, the control processing is ended.

Although the display update processing of the display device 300 (the step S215) is executed after the processing regarding group (the steps S206 to S214) in FIG. 7, the display update processing (the step S215) may be executed prior to the processing regarding group (the steps S206 to S214).

The following will describe the case where the display (a) in FIG. 9 is updated to the display (b) by a user's operation. For example, it is assumed that in order to activate a mail function, the user performs an operation of clicking a mail icon or the like displayed in the initial screen using the input device 200 (the step S201). In this case, similarly as in displaying the initial screen, the switching request section 107 determines whether or not the user's operation inputted at the step S201 is indicative of a display switching instruction (the step S202). In this case, because the user's operation is an operation to activate the mail function, it is determined at the step S202 that the user's operation is not indicative of a display switching instruction (NO at the step S202), the control processing proceeds to the step S203. At the step S203, the update request section 101 determines whether or not the user's operation inputted at the step S201 requires updating of the display on the display device 300. Here, the screen C is displayed as a new screen corresponding to the mail function as shown in the display (b) in FIG. 9. Thus, it is determined at the step S203 that the user's operation requires updating of the display on the display device 300 (YES at the step S203), the control processing proceeds to the step S204. At the step S204, the update request section 101 makes an update request to the display update section 102 for updating the display (a) of the display device 300 to the display (b). Subsequent to the step S204, in response to the update request, the display update section 102 causes the layout holding section 103 to hold layout information of each screen included in the update request as shown in FIG. 10(b) (the step S205). This update request includes the layout information of the screens A to C. Then, the processing at the steps S206 to S214 are executed for the screens A to C. At the step S207, a group 2 is newly created. Here, in FIG. 9(b), the screens A and B are fully covered with the screen C, and only the screen C is visible on the display device 300. Thus, it is determined at the step S210 that only the screen C is a visible screen, and the group 2 to which only the screen C belongs is added to the group holding section 106 at the step S214 as shown in FIG. 11(b). Subsequent to the step S214, the display update section 102 displays each screen on the display device 300 in accordance with the layout information (FIG. 10(b)) held in the layout holding section 103 (the step S215), and then, the control processing is ended.

The following will describe the case where a display switching instruction is inputted from the input device 200 by a user's operation. When a display switching instruction is inputted from the input device 200 at the step S201 in FIG. 7, the switching request section 107 determines that the user's operation is indicative of the display switching instruction (YES at the step S202), the control processing proceeds to the display switching processing (a step S216). With reference to FIG. 8, the display switching processing will be described in detail below. As shown in FIG. 8, the switching request section 107 obtains the group information held in the group holding section 106, and makes a list display request to the display update section 102 for displaying a switching destination screen candidate list shown in FIG. 9(c) (a step S221). The display update section 102 displays the switching destination screen candidate list on the display device 300 in accordance with the group information included in the list display request as shown in FIG. 9(c) (a step S222). It is noted that because the display update section 102 executes update processing in the display switching processing, the display update section 102 does not make a group assigning request and does not cause the layout holding section 103 to hold the layout information of the switching destination screen candidate list. Thus, as shown in FIGS. 10(c) and 11(c), the layout information and the group information are not changed. After the switching destination screen candidate list is displayed at the step S222, the user selects one of the groups displayed in the switching destination screen candidate list using the input device 200 as a next operation (a step S223). One example of a manner for the selection is to select a group by the user moving a selection range using a cursor key or the like and pressing a decision key. Another example is to select a group by the user clinking directly the group using a pointing device such as a mouse. Still another example is to select a group by user pressing a key corresponding to a numeral displayed on the left side.

Although a switching destination screen candidate is selected in a group unit in the present embodiment, a switching destination screen candidate may be selected in a screen unit. In this case, even when any one of screens belonging to one group is selected, the group to which the selected screen belongs is determined to be selected. Hereinafter, the explanation will be continued on the assumption that the group 1 is selected.

When a group selection is inputted from the input device 200 to the switching request section 107 at the step S223, the switching request section 107 makes a layout update request to the layout update section 108 (a step S224). Subsequent to the step S224, in response to the layout update request from the switching request section 107, the layout update section 108 refers to the group information held in the group holding section 106, and updates the layout information held in the layout holding section 103 such that all the screens belonging to the selected group are displayed on the display device 300 so as to be visible (a step S225). Here, when the group 1 is selected, the layout update section 108 changes the display order for the screens A and B belonging to the group 1 such that they are to be displayed in the foreground as shown in FIG. 10(d). Thus, finally, as shown in FIG. 9(d), the screens A and B are displayed on the display device 300 so as to be visible. It is noted that an item in which a display/non-display state can be set may be additionally provided in the layout information, and only the screens A and B may be set to be in a display state and the screen C may be set to be in a non-display state without changing the display order.

Subsequent to the step S225, the switching request section 107 makes a non-display request to the display update section 102 for causing the switching destination screen candidate list to be in a non-display state (a step S226). Subsequent to the step S226, in response to the non-display request from the switching request section 107, the display update section 102 causes the switching destination screen candidate list to be in the non-display state (a step S227). Subsequent to the step S227, the switching request section 107 makes a display switching request to the display update section 102 (a step S228). In the response to the display switching request from the switching request section 107, the display update section 102 displays all the screens belonging to the selected group on the display device 300 in accordance with the layout information of the layout holding section 103 which is updated by the layout update section 108 (a step S229). It is noted that because the update processing is executed in the display switching processing, the display update section 102 does not make a group assigning request. Thus, as shown in FIG. 11(d), the group information is not changed. Further, if group assigning processing is executed based on the layout information updated at the step S225, the display state of FIG. 9(d) is the same as that of FIG. 9(a). Thus, the group information consisting of the screens A and B has been already held in the group holding section 106, and the group information is not changed.

It is noted that in FIG. 8, the non-display processing of the switching destination screen candidate list (the steps S226 and S227) may be executed after the step S229.

As described above, according to the display control device 100 of the present embodiment, the layout information of each screen is automatically held according to the update processing by the display update section 102. Thus, even when a plurality of switching targets occurs by the update processing, the user does not need to individually designate in advance screens to be the switching targets, and the operation does not become complicated, thereby reducing the possibility of a wrong operation. Further, by displaying the switching destination screen candidate list on the display device 300, in addition to the screen displayed in the foreground of the display device 300, it is possible to know display states of a plurality of screens which are partially or entirely displayed on the display device 300, and thus the user can know a display state after switching at a glance. Therefore, according to the display control device 100 of the present embodiment, without a complicated operation, it is possible to switch the display on the display device 300 to a screen desired by the user in a state where it is possible for the user to know the display state after switching at a glance.

It is noted that in FIG. 1, the one update request section 101 and the one display device 300 are provided, but a plurality of update request sections 101 and a plurality of display devices 300 may be provided.

Further, in FIG. 7, the display state determination section 105 makes the display state determination in response to the display state determination request from the group assigning section 104, but the present invention is not limited thereto. The display state determination section 105 may make the display state determination when the display update section 102 causes the layout holding section 103 to hold the layout information. In this case, the display state determination section 105 holds a result of the determination. Then, in response to the display state determination request from the group assigning section 104, the display state determination section 105 sends the held determination result to the group assigning section 104.

Further, in FIG. 7, all the screens which are displayed on the display device 300 so as to be visible are set as targets to be grouped, but the present invention is not limited thereto. As shown in FIG. 12, in the case where a fixed display screen which does not become display switching targets and is always fixedly displayed at a specific position is displayed on the display device 300 so as to be visible, the fixed display screen may be excluded from targets to be grouped. FIG. 12 shows an example in which fixed display screens are displayed on the display device 300.

Further, the case where the display update instruction is made based on the user's operation has been described with reference to FIG. 7, but a display update instruction may be made based on a change in a state of communication with the outside such as incoming call and incoming mail, or based on a change in a device state such as a voltage drop of a battery.

Second Embodiment

Figure 13:
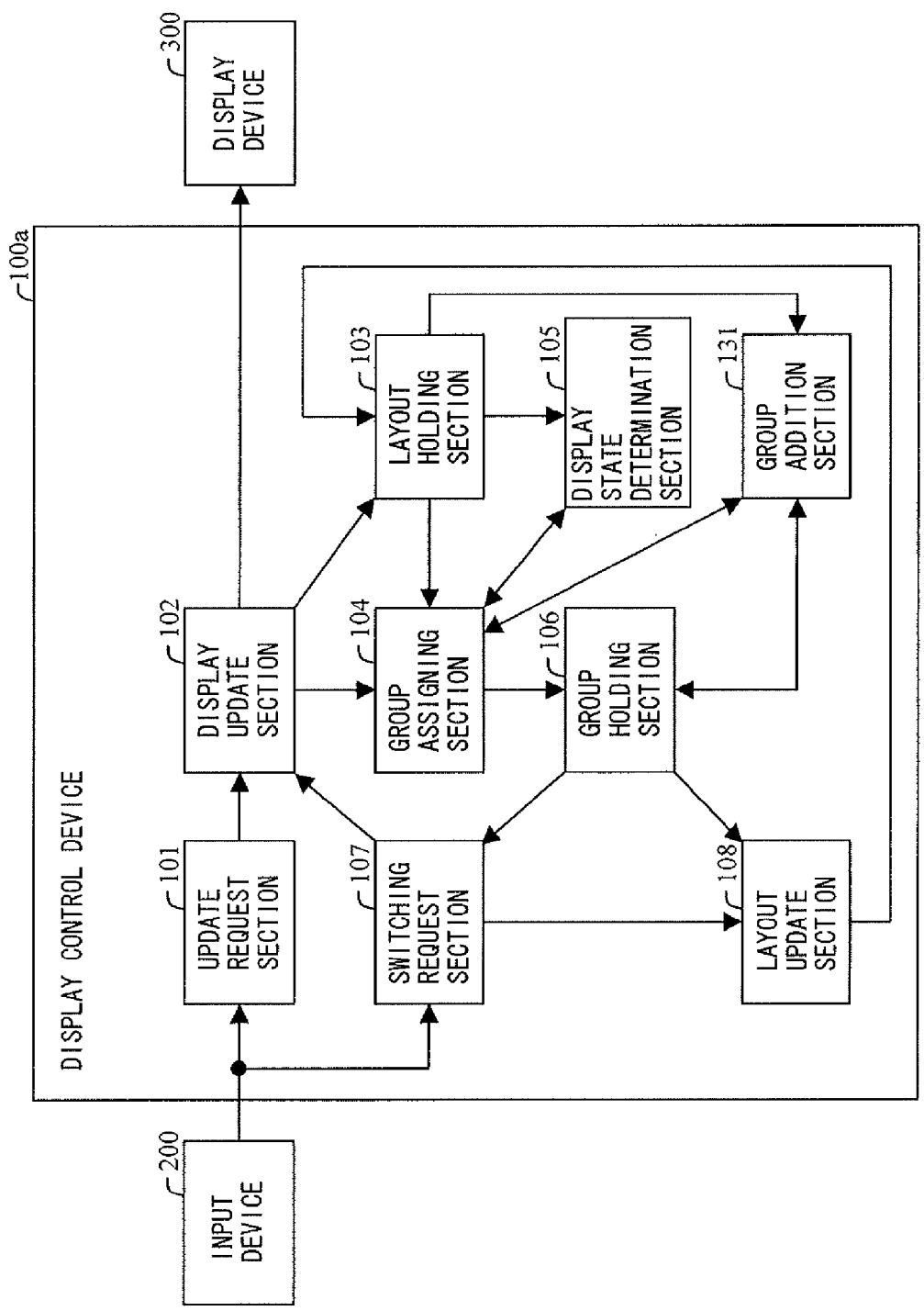
FIG. 13 is a block diagram showing a schematic configuration of a display control device 100a according to a second embodiment.

FIG. 13 is a block diagram showing a schematic configuration of a display control device 100a according to a second embodiment of the present invention. In FIG. 13, the same components as those in FIG. 1 are designated by the same reference characters, and the description thereof will be omitted. The display control device 100a according to the second embodiment differs from that according to the first embodiment in further including a group addition section 131. The following will describe mainly the difference.

As shown in FIG. 13, a group assigning section 104 makes a group addition request to the group addition section 131 after causing a group holding section 106 to hold group information. In response to the group addition request from the group assigning section 104, the group addition section 131 refers to layout information held in a layout holding section 103, assigns screens which can be simultaneously displayed on a display device 300 without overlapping with each other to one group, and adds group information consisting of the assigned group to the group holding section 106.

Figure 14:
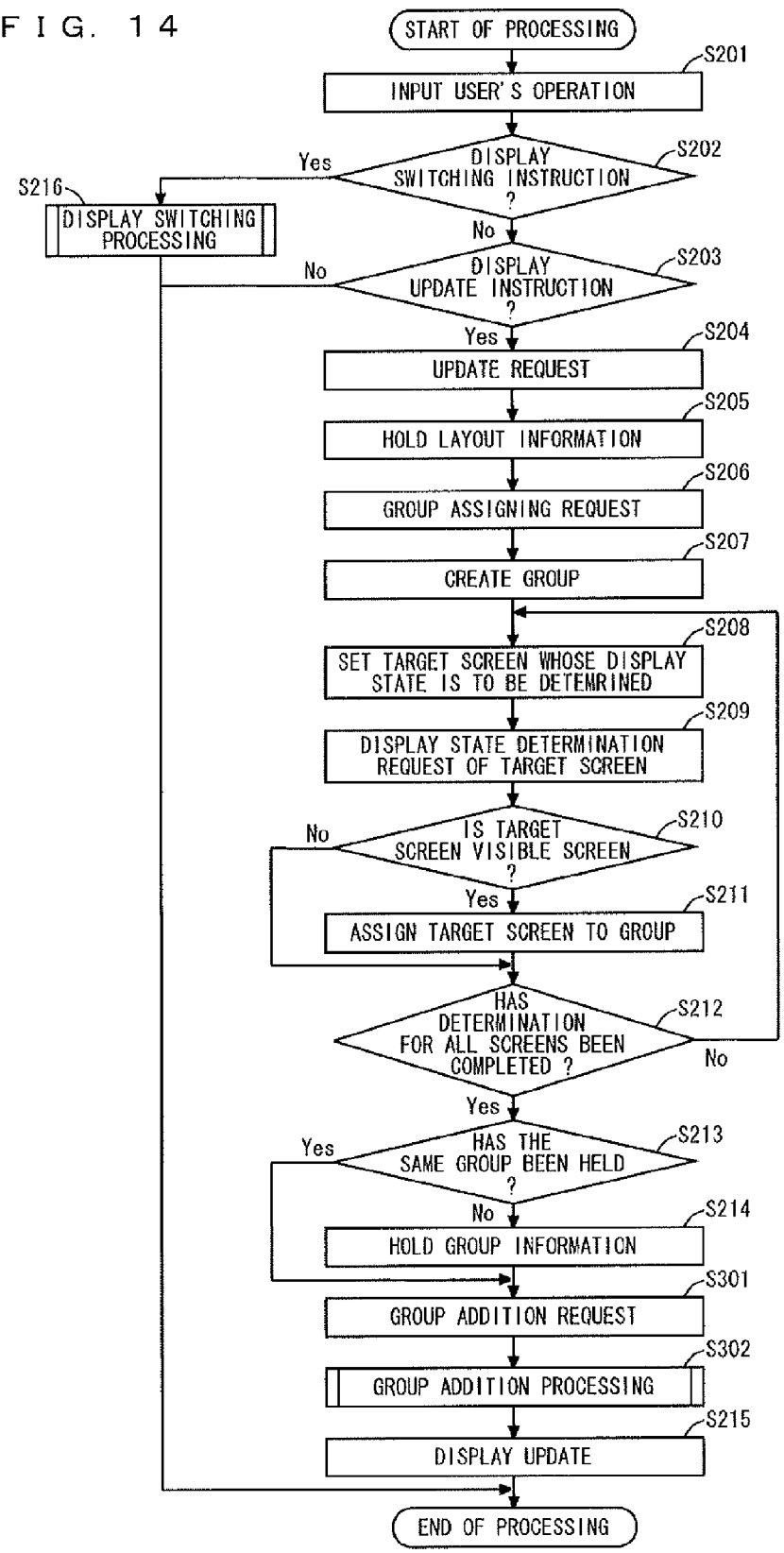
FIG. 14 is a flow chart showing control processing of the display control device 100a according to the second embodiment.
Figure 15:
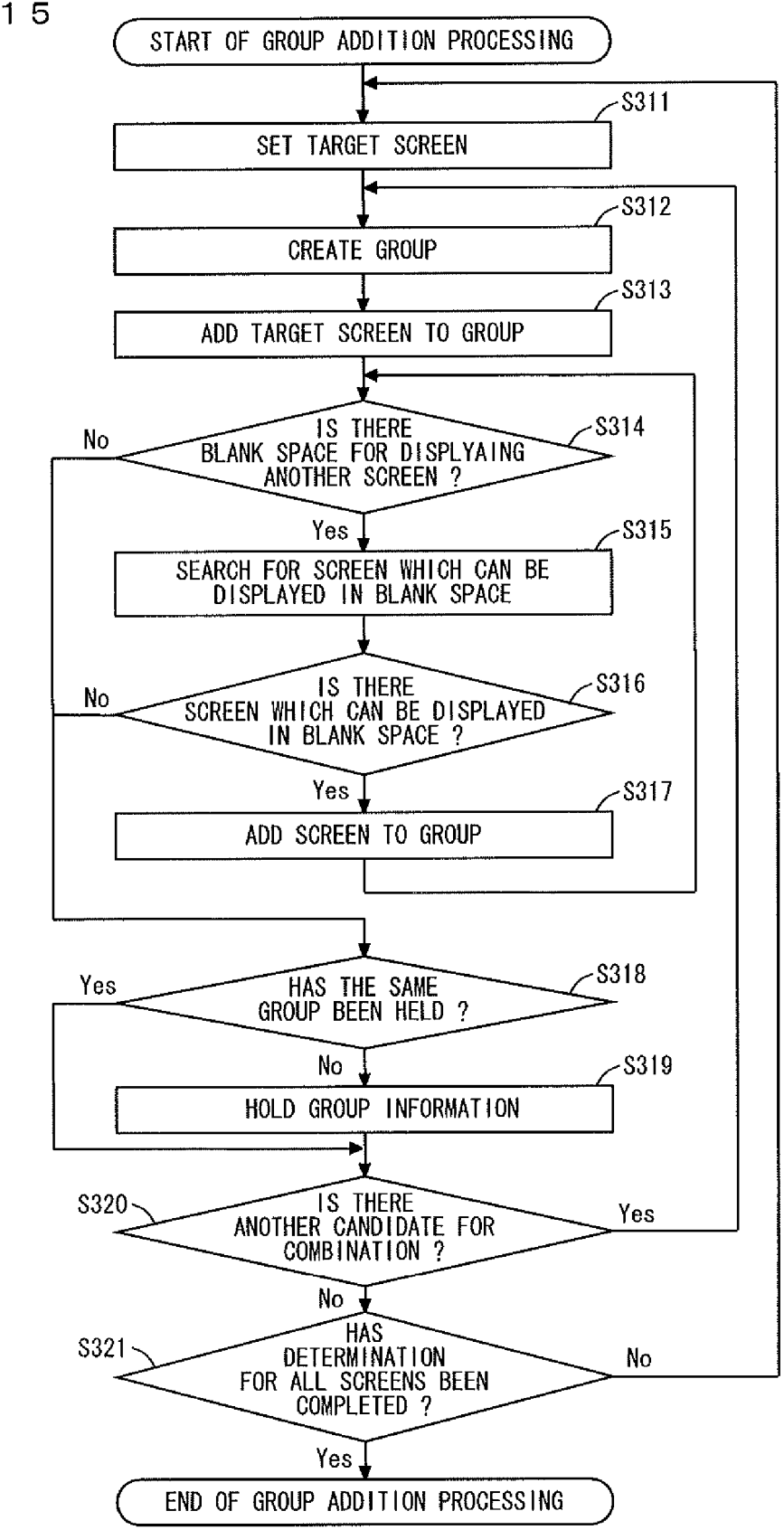
FIG. 15 is a flow chart showing in detail group addition processing.

The following will describe a procedure of control processing of the display control device 100a according to the second embodiment of the present invention with reference to FIGS. 14 and 15. FIG. 14 is a flow chart showing the control processing of the display control device 100a according to the second embodiment. The flow chart shown in FIG. 14 differs from the flow chart shown in FIG. 7 in that steps S301 and S302 are added prior to the step S215. The other steps are the same as those in FIG. 7 and designated by the same reference characters, and the description thereof will be omitted. FIG. 15 is a flow chart showing in detail group addition processing.

Figure 16:
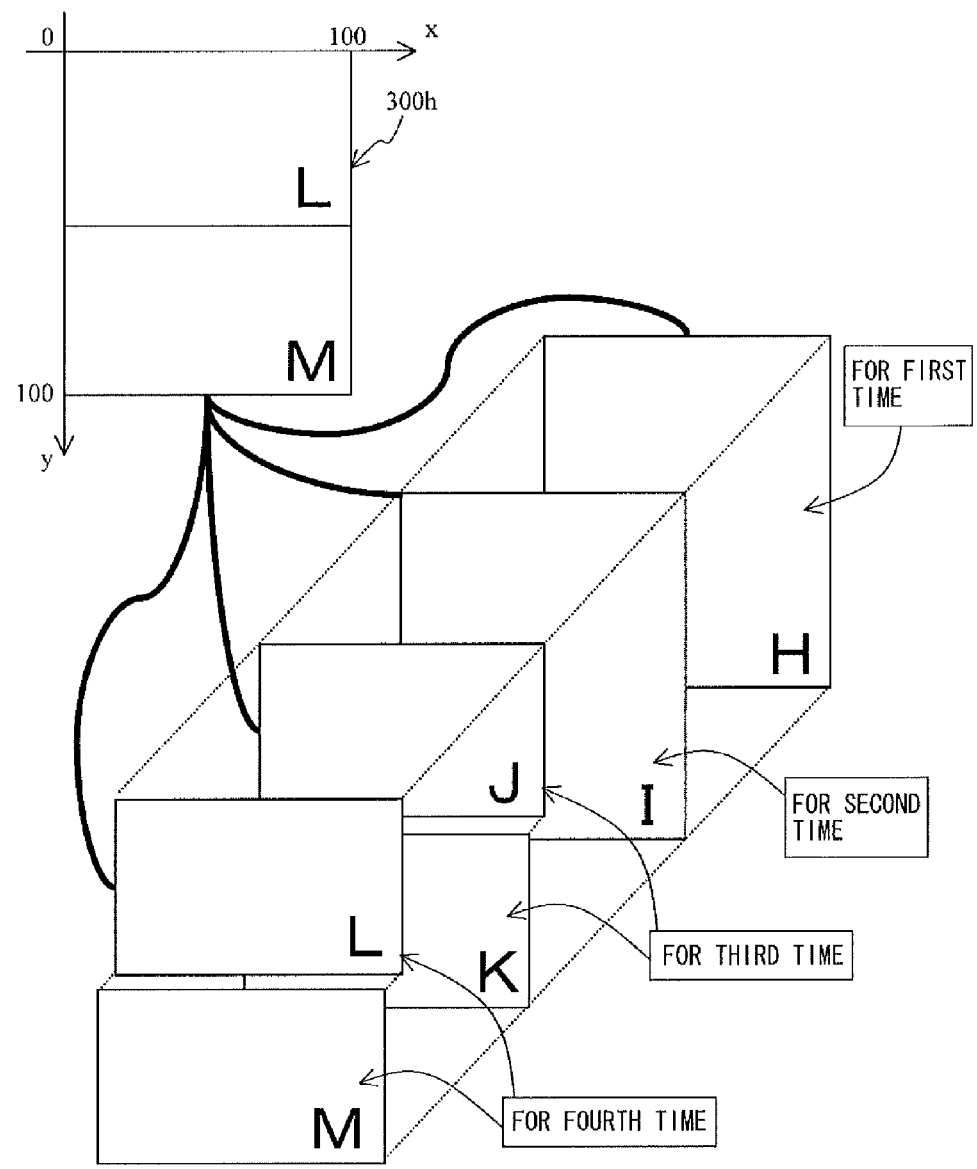
FIG. 16 is a schematic view showing a state where screens H to M are hierarchically displayed on a display device 300.

In the following description, as shown in FIG. 16, it is assumed that in the control processing shown in FIG. 14, processing at steps S213 to S215 have been already executed based on: a display update instruction for the first time to display a screen H; a display update instruction for the second time to display a screen I; and a display update instruction for the third time to display screens J and K, and that the processing at the steps S213 and S214 have been already executed based on a display update instruction for the fourth time to display screens L and M. FIG. 16 is a schematic view showing a state where the screens H to M are hierarchically displayed on the display device 300. In FIG. 16, the upper left corner of a display area 300h of the display device 300 is set as an origin, and the horizontal axis and the vertical axis are set as X axis and Y axis, respectively. In addition, in FIG. 16, the display area of the display device 300 has a width of 100 and a height of 100. Further, in the display state of FIG. 16, the layout information held in the layout holding section 103 is as shown in FIG. 17. Further, in the display state of FIG. 16, the group information held in the group holding section 106 is as shown in FIG. 18. FIG. 18(a) shows group information when the processing at the steps S213 and S214 are executed based on the display update instruction for the fourth time to display the screens L and M, and FIG. 18(b) shows group information when processing at the steps S301 and S302 are executed based on the display update instruction for the fourth time to display the screens L and M.

As shown in FIG. 14, after group holding processing (the step S214) is finished, the group assigning section 104 makes a group addition request to the group addition section 131 (the step S301). Then, the group addition section 131 starts the group addition processing shown in FIG. 15 (the step S302). As shown in FIG. 15, the group addition section 131 sets a target screen to be subjected to group assigning processing among the screens held in the layout holding section 103 (a step S311). Then, the group addition section 131 newly creates a group (a step S312). Here, the screen H held at the head of the layout holding section 103 is set as a target screen to be subjected to the group assigning processing, and a group 5 is created as a new group. Here, as an example, a number for the group created at the step S312 starts with a number obtained by adding 1 to a number of times of display update processing in FIG. 14, and is increased by 1 every time the group information is held at a later-described step S319.

Subsequent to the step S312, the group addition section 131 assigns the target screen to the created group (a step S313). Here, the group addition section 131 assigns the target screen H to a group 1. Then, when the target screen is displayed, the group addition section 131 determines whether or not there is a blank space for displaying another screen on the display device 300 (a step S314). Here, because the target screen H covers the entire display area of the display device 300, there is no blank space. Thus, it is determined at the step S314 that there is no blank space, and the processing proceeds to a step S318. At the step S318, whether or not a group having the same constitution as the created group has been already held in the group holding section 106. When there is no group having the same constitution as the created group (NO at the step S318), the group is held (the step S319), and when there is a group having the same constitution as the created group (YES at the step S318), the holding processing is skipped. Here, as shown in FIG. 18(a), because the group 5 has the same constitution as the group 1 held in the group holding section 106, the group 5 is not held at the step S319. Thus, the processing proceeds to a step S320. The group addition section 131 determines whether or not there is another candidate for combination as a target screen (the step S320). Here, there is no screen which can be combined with the target screen H (NO at the step S320), the processing proceeds to a step S321. At the step S321, the group addition section 131 determines whether or not the determination for all the screens stored in the layout holding section 103 has been completed. In this case, because the determination for the screens other than the screen H has not been completed (NO at the step S321), the processing returns to the step S311.

At the step S311, the group addition section 131 changes the target screen to the next screen I, and creates a group 5 again (the step S312). The processing at the steps S313 to S321 for the target screen I are the same as that for the screen H, and thus the description thereof will be omitted.

Again, at the step S311, the group addition section 131 changes the target screen to the next screen J, and creates a group 5 again (the step S312). Then, the group addition section 131 assigns the target screen J to the group 5 (the step S313), and makes the blank space determination (the step S314). In this case, because the target screen J has only a height of 50, when the screen J is displayed, a blank space with a width of 100 and a height of 50 appears in the lower half on the display device 300 having the width of 100 and the height of 100. Thus, it is determined as YES at the step S314, the group addition section 131 searches for a screen which can be displayed in the blank space (a step S315). Subsequent to the step S315, the group addition section 131 determines whether or not, in the layout holding section 103, there is a screen which can be displayed in the blank space (a step S316). Here, because there is the screen K as a screen which can be displayed in the blank space, it is determined as YES at the step S316. Then, the group addition section 131 assigns the screen K to the group 5 (the step S317), and determines again whether or not there is a blank space when the screen J and the screen K are displayed (the step S314). Here, because there is no blank space when the screen J and the screen K are displayed, it is determined as NO at the step S314, and the processing proceeds to the step S318. Here, as shown in FIG. 18(a), because the group has the same constitution as the group 3 held in the group holding section 106, the group 5 is not held at the step S319. Thus, the processing proceeds to the step S320. The group addition section 131 determines whether or not there is another candidate for combination as a target screen (the step S320). Here, because there is the screen M as a candidate for combination with the screen J other than the screen K (YES at the step S320), the processing returns to the step S312, and a group 5 is created again at the step S313. After the screen J is assigned to the group 5 at the step S313 again, it is determined as YES at the step S314 because there is a blank space, and a screen which can be displayed in the blank space is searched for again (the step S316). Here, because the screen K is found last time, the screen K is excluded from search targets. Except for the screen K, there is the screen M. Thus, it is determined as YES at the step S316, and the screen M is assigned to the group 5 (the step S317). Then, the blank space determination is made again (the step S314). Here, because no blank space is left after the screens J and M are displayed, it is determined as NO at the step S314, and the processing proceeds to the step S318. Here, as shown in FIG. 18(a), a group having the same constitution as the group 5 consisting of the screens J and M has not been held in the group holding section 106 yet. Thus, the processing proceeds to the step S319, and the group 5 is held in the group holding section 106 as shown in FIG. 18(b). Because there is not any other screen which can be displayed in combination with the screen J, it is determined as NO at the step S320, and the processing proceeds to the step S321. Then, the processing proceeds as the target screen is sequentially changed to the screens K, L and M, but the processing is the same as the above processing and thus the description thereof will be omitted. Finally, by the group addition processing, as shown in FIG. 18(b), the group 5 and a group 6 are added to the group holding section 106 of FIG. 18(a).

As described above, according to the display control device 100a of the present embodiment, in addition to a combination of screens which are previously displayed by the group assigning section 104, another combination of screens which can be simultaneously displayed on the display device 300 without overlapping with each other can be added to a group. Then, by displaying a switching destination screen candidate list on the display device 300 based on the added group, it is possible to know a display state of a display, which has not been previously displayed, after switching at a glance. Further, in the case where an application which is a display request section is dynamically added by download or the like, it is possible to know a display state after switching at a glance without a complicated operation.

In the above description, in the group addition processing, a combination of screens which can be simultaneously displayed is determined by taking into consideration width, height, display position (X- and Y-coordinates) of the screen. However, a combination of screens may be determined by taking into consideration only width and height of the screen.

Further, in the above description, the entire area in which the display device 300 is capable of performing a display is set as the display size of the display device 300. However, as shown in FIG. 12, in the case where there is a fixed display screen which does not become a display switching target and is always fixedly displayed at a specific position, only an area obtained by excluding the fixed display screen (the part shown by the screen A in FIG. 12) may be set as the display size of the display device 300.

Further, in the above description, in the group addition processing, all screens which can be simultaneously displayed are added to a group. However, there may be screens which cannot be simultaneously displayed due to resource contention of sound, a communication device, and the like. In this case, a step of confirming a resource used by a screen may be provided prior to the step S317, and a screen using the same resource as a screen already added to a group may not be added to the group.

Third Embodiment

Figure 19:
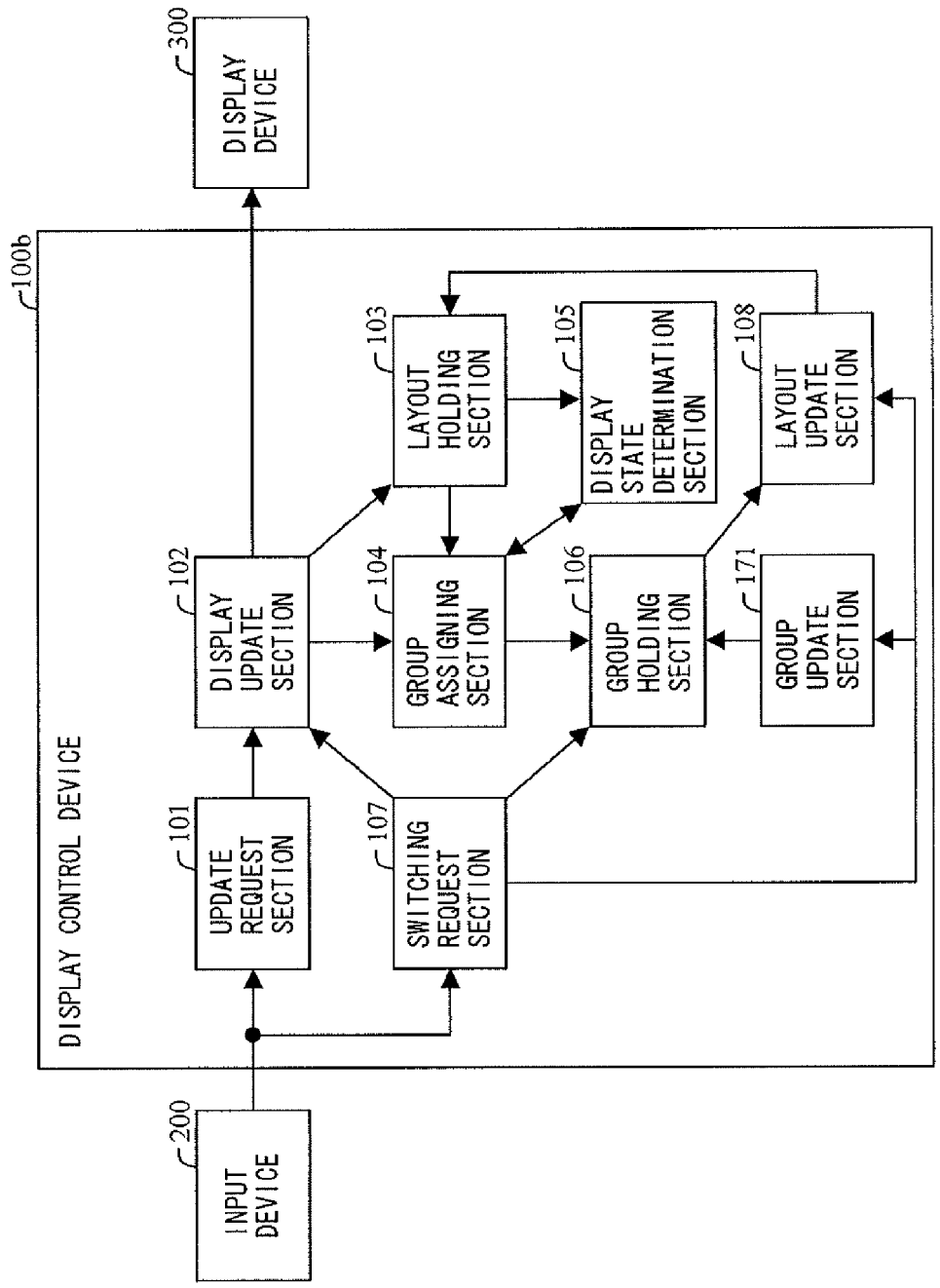
FIG. 19 is a block diagram showing a schematic configuration of a display control device 100b according to a third embodiment.

FIG. 19 is a block diagram showing a schematic configuration of a display control device 100b according to a third embodiment of the present invention. In FIG. 19, the same components as those in FIG. 1 are designated by the same reference characters, and the description thereof will be omitted. The display control device 100b according to the third embodiment differs from that according to the first embodiment in further including a group update section 171. The following will describe mainly the difference.

Figure 20:
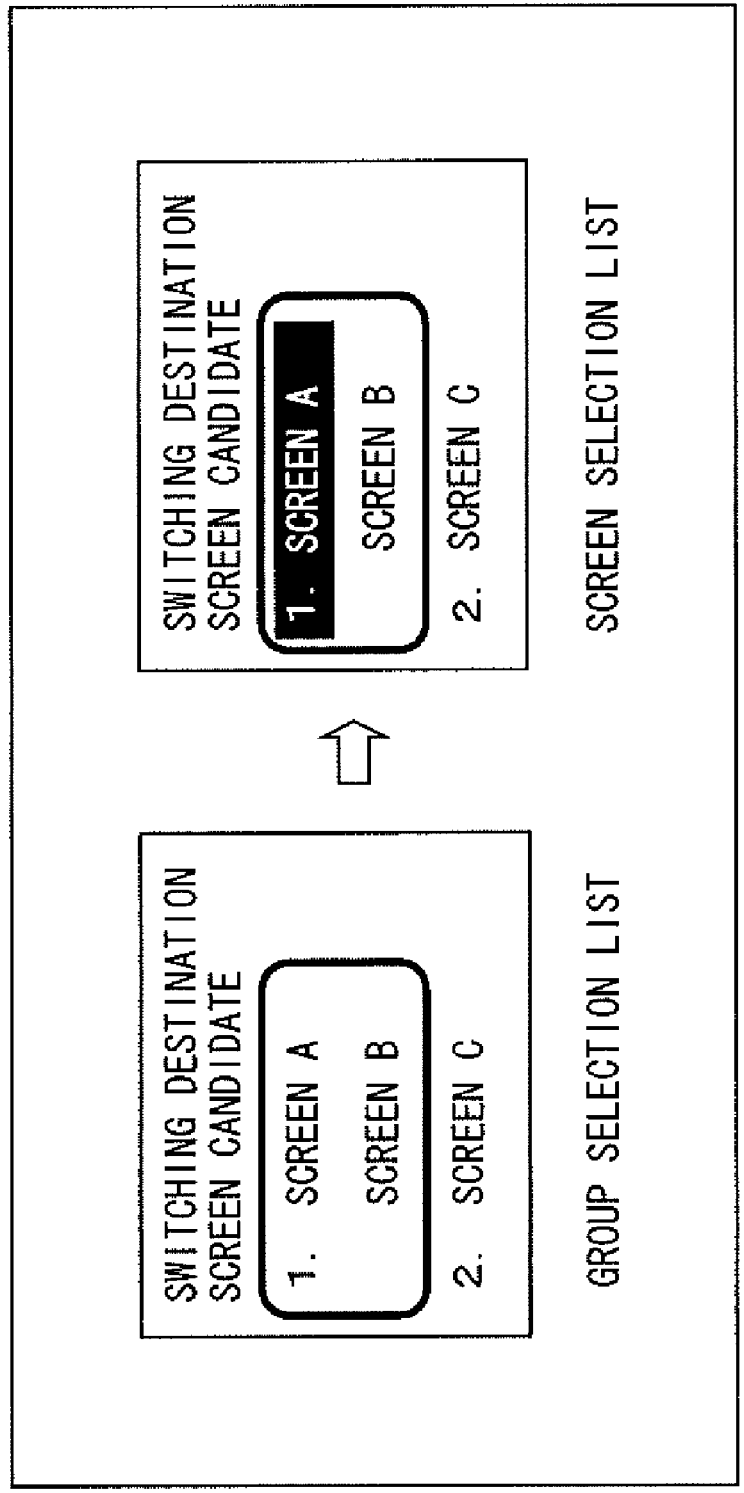
FIG. 20 shows a display example of a group selection list and a screen selection list.

As shown in FIG. 19, a switching request section 107 can make a list display request for two types of lists, a group selection list and a screen selection list shown in FIG. 20, as switching destination screen candidates. FIG. 20 shows a display example of the group selection list and the screen selection list. The group selection list is a list showing switching destination screens in a group unit, wherein a switching destination screen can be selected only in a group unit. The screen selection list is a list showing switching destination screens in a group unit, wherein a switching destination screen can be selected only in a unit of switching destination screen. A manner for switching the two types of lists shown in FIG. 20 is to switch between the screen selection list and the group selection list by pressing a key provided for list switching. In the case of selecting one screen as a switching destination screen candidate, the user switches the switching destination screen candidate list from the group selection list to the screen selection list. It is noted that the screen selection list may be a list wherein it is possible to make a selection in a group unit. In this case, only the screen selection list may be displayed as the switching destination screen candidate list, and in a state where one screen (screen A) is in a selection range, the screen (screen A) may be determined to be selected when a screen selection key is pressed, and a group (group 1) to which the screen (screen A) belongs may be determined to be selected when a group selection key is pressed. In the following description, the switching request section 107 is assumed to make a list display request for displaying, as a switching destination screen candidate, a screen selection list wherein it is possible to make a selection both in a group unit and in a screen unit.

In response to a layout update request from the switching request section 107, a layout update section 108 changes layout information held in a layout holding section 103. The group update section 171 refers to the changed layout information, and updates group information held in a group holding section 106. Specifically, the group update section 171 refers to the changed layout information, and assigns screens which are to be displayed on a display device 300 so as to be partially or entirely visible to one group.

Figure 21:
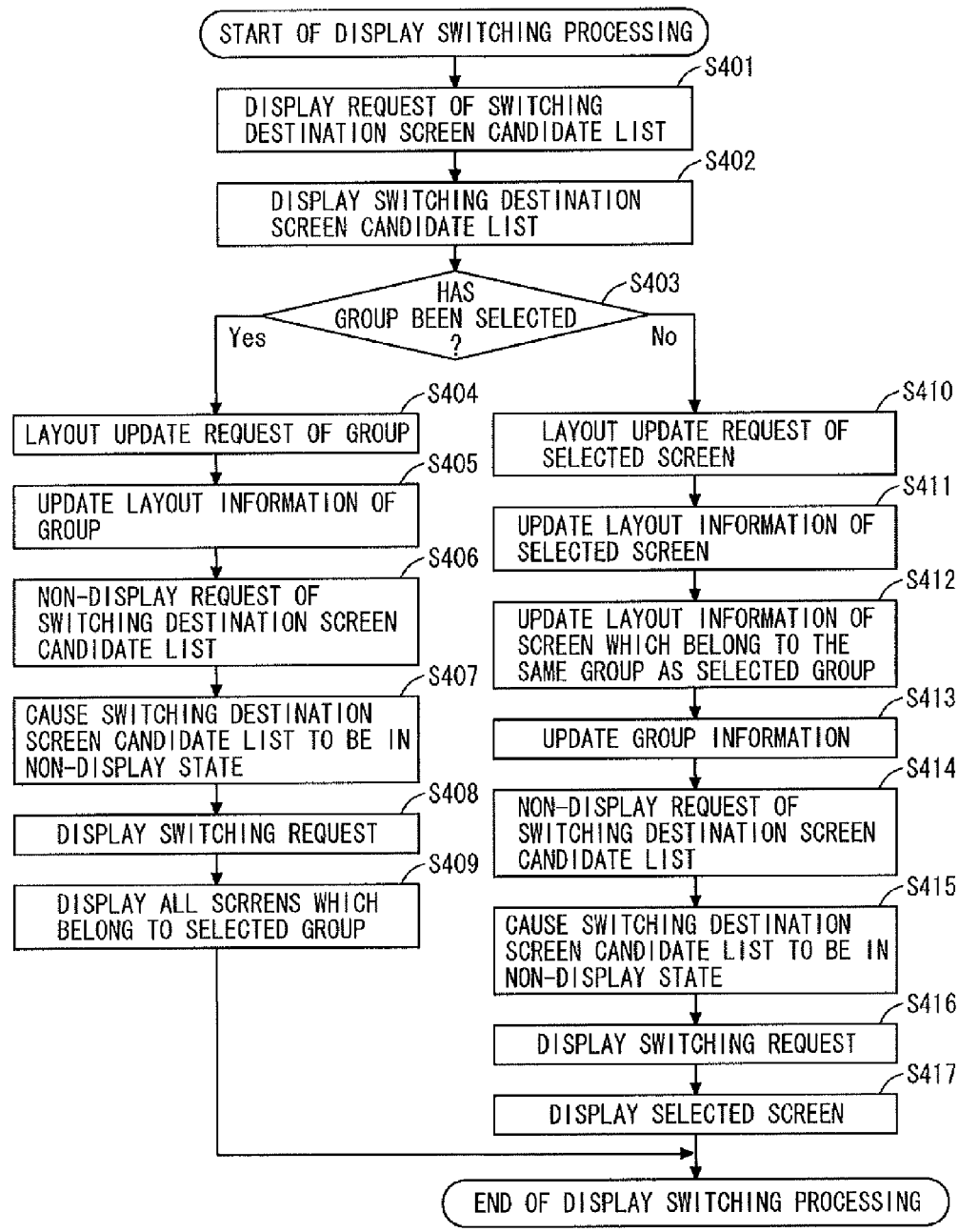
FIG. 21 is a flow chart showing in detail display switching processing according to the third embodiment.

The following will describe a procedure of control processing of the display control device 100b according to the third embodiment of the present invention with reference to FIGS. 21 to 24. In the present embodiment, a flow other than display switching processing (the step S216 in FIG. 7) is the same as in the first embodiment, and thus the description thereof will be omitted. FIG. 21 is a flow chart showing in detail display switching processing according to the third embodiment. FIG. 22 illustrates a state where a display on the display device 300 is updated from (a) to (d) by the control processing according to the third embodiment. FIG. 23 shows layout information in the layout holding section 103 corresponding to the displays (a) to (d) in FIG. 22, respectively. FIG. 24 shows group information in the group holding section 106 corresponding to the displays (a) to (d) in FIG. 22, respectively.

First, when the user inputs a display switching instruction using an input device 200 after the display (a) in FIG. 22 is switched to the display (b), at a step S401 in FIG. 21, the switching request section 107 makes a list display request to a display update section 102 for displaying a screen selection list shown in FIG. 22(c) as a switching destination screen candidate list (a step S401). The display update section 102 displays the screen selection list on the display device 300 in accordance with group information included in the list display request (a step S402). Subsequent to the step S402, when the user selects a screen or a group, the switching request section 107 determines whether a group or a screen is selected on the screen selection list (a step S403). When a group is selected (YES at the step S403), the processing proceeds to a step S404, and all the screens which belong to the group are displayed at a step S409. Here, the processing at the steps S404 to S409 are the same as that at the steps S224 to S229 in FIG. 8. Thus, the detailed description of the processing at the steps S404 to S409 will be omitted.

On the other hand, when it is determined at the step S403 that a screen has been selected, the processing proceeds to a step S410. At the step S410, the switching request section 107 makes a layout update request to the layout update section 108 for enlarging the display size of the selected screen such that the selected screen is to be displayed across the entire display area of the display device 300. In response to the layout update request, the layout update section 108 enlarges the display size of the selected screen to the size of the display area of the display device 300, and updates layout information held in the layout holding section 103 such that the selected screen is to be displayed in the foreground of the display device 300 (a step S411). Here, when a screen A is selected, the layout update section 108 changes the display size of the screen A to the size (a width of 100 and a height of 100) of the display area of the display device 300 and changes the display order for the screen A to "1" as shown in FIGS. 22(d) and 23(d). Subsequent to the step S411, the layout update section 108 refers to the group information held in the group holding section 106, and updates the layout information held in the layout holding section 103 so as to enlarge the display size of another screen which belongs to the same group as the selected screen to the size of the display area of the display device 300 (a step S412). Here, a screen B belongs to the same group as the screen A. Thus, the layout update section 108 changes the display size of the screen B to the size (a width of 100 and a height of 100) of the display area of the display device 300 as shown in FIG. 23(d). It is noted that when, in addition to the screen B, there is another screen which belongs to the same group as the screen A, the layout update section 108 updates the layout information such that the other screen has the same size as the screen A. Here, because there is not any other screen which belongs to the same group as the screen A except for the screen B, the processing proceeds to a step S413.

At the step S413, the group update section 171 refers to the layout information updated by the layout update section 108, and updates the group information in the group holding section 106. Specifically, the group update section 171 assigns a screen which is to be displayed on the display device 300 so as to be partially or entirely visible to one group. Here, the screens A to C are to be displayed across the entire display area of the display device 300. Thus, a combination of screens which are to be displayed on the display device 300 so as to be partially or entirely visible is only the screen A, only the screen B, or only the screen C. Thus, the group update section 171 deletes the group 1 to which the screens A and B whose layout information has been updated belong. Then, the group update section 171 adds a group 3 to which the screen A belongs and a group 4 to which the screen B belongs as shown in FIG. 24(d).

Subsequent to the step S413, the switching request section 107 makes a non-display request to the display update section 102 for causing the screen selection list as the switching destination screen candidate list to be in a non-display state (a step S414). Subsequent to the step S414, in response to the non-display request from the switching request section 107, the display update section 102 causes the screen selection list as the switching destination screen candidate list to be in the non-display state (a step S415). Subsequent to the step S415, the switching request section 107 makes a display switching request to the display update section 102 (a step S416). In response to the display switching request from the switching request section 107, the display update section 102 enlarges and displays the selected screen on the display device 300 in accordance with the layout information in the layout holding section 103 which has been updated by the layout update section 108 (a step S417).

As described above, according to the display control device 100b of the present embodiment, by selecting one screen on the switching destination screen candidate list, it is possible to display the selected screen. In addition, by updating the layout information of the selected screen so as to enlarge the display size of the selected screen, it is possible to display the selected screen such that the display size of the selected screen is enlarged to the display size of the display area of the display device 300. Further, by updating the group information held in the group holding section 106 based on the layout information in which the display size is enlarged, it is possible to easily change the group information already held in the group holding section 106.

Further, according to the display control device 100b of the present embodiment, the layout update section 108 updates the layout information of screens which belong to the same group as the selected screen. Here, in a conventional display control device which causes an icon to be displayed, after the screens in a selected group are displayed together, it is necessary to make an instruction to change the display size and the display position of each screen. On the other hand, according to the display control device 100b of the present embodiment, because the layout update section 108 updates the layout information of the screens which belong to the same group as the selected screen, a complicated operation is not needed.

In the above description, the layout update section 108 updates the layout information so as to enlarge the display size of the selected screen, but the present invention is not limited thereto. For example, the display position of the selected screen may be updated to be a display position desired by the user. In addition, a type of updating to be performed may be set freely by the user.

Further, when it is intended only to change the group information already held in the group holding section 106, the step S412 in FIG. 21 may be omitted. When only the display size of the selected screen is enlarged to the same size as the display area of the display device 300 and the layout information is updated such that the selected screen is displayed in the foreground of the display device 300, the screens A and C are displayed across the entire display area of the display device 300, and only the screen B is displayed in the lower half of the display area of the display device 300. Thus, as a combination of screens which are to be displayed on the display device 300 so as to be partially or entirely visible, there is only the screen A, only the screen B, or only the screen C. Thus, first, the group update section 171 deletes the group 1 to which the screen A whose layout information is updated belongs. Then, the group update section 171 adds a group 3 to which the screen A belongs, and a group 4 to which the screen B belongs.

Further, when it is intended only to enlarge the display size of the selected screen to the display size of the display area of the display device 300 and to display the selected screen, the steps S412 and S413 in FIG. 21 may be omitted.

Further, when it is intended only to select one screen on the switching destination screen candidate list and to display only the selected screen without changing the display size of the selected screen, the layout information may be updated such that the selected screen is to be displayed in the foreground without enlarging the selected screen and changing the display size and the display position of the selected screen at the step S411 in FIG. 21, and the steps S412 and S413 in FIG. 21 may be omitted.

Further, when it is intended to select one screen on the switching destination screen candidate list, to display only the selected screen without changing the display size of the selected screen, and to update the group information, the layout information may be updated such that the selected screen is to be displayed in the foreground without enlarging the selected screen and changing the display size and the display position of the selected screen at the step S411 in FIG. 21, and the step S412 in FIG. 21 may be omitted. In this case, the screen A is displayed so as to cover the upper half of the screen C. Thus, as combinations of screens which are to be displayed on the display device 300 so as to be partially or entirely visible, there are a combination of the screens A and C, a combination of the screens A and B, and only the screen C. Thus, the group update section 171 adds a group 3 to which the screens A and C belong. In this case, the group information already held in the group holding section 106 is not changed, the group 3 to which the screens A and C belong is newly added.

It is noted that the display control devices according to the above first to third embodiments are feasible by an information processor such as a general computer system. The computer system consists of, for example, a microprocessor, a ROM, a RAM, and the like. A program which causes the computer system to execute processing of each section of the above display control device is stored in a predetermined information storage medium. The computer system can achieve the function of each section by reading and executing the program stored in the predetermined information storage medium. In order to achieve the predetermined functions, the program is constructed by combining a plurality of instruction codes indicative of instructions to the computer. Examples of information storage media for storing the above program are a flexible disc, a hard disc, a CD-ROM, an MO, a DVD, a DVD-ROM, a DVD-RAM, a BD (Blu-ray Disc), and a semiconductor memory. Alternatively, the above program may be supplied to the above information processor through another medium or a communication line. Alternatively, the above program may be supplied to another information processor through another medium or a communication line.

It is noted that each section of the display control devices according to the above first to third embodiments may be realized by one chip which is made using an integrated circuit such as an LSI (Large Scale Integration) or a dedicated signal processing circuit. Alternatively, the display control devices according to the above first to third embodiments may be realized by one chip which is made so as to have the above function of each section. Although the LSI is described here, the integrated circuit is referred to as an IC, a system LSI, a super LSI, or an ultra LSI depending on difference in integration degrees. A technique of integrated circuit implementation is not limited to the LSI, but may be realized by a dedicated circuit or a universal processor. An FPGA (Field Programmable Gate Array) which is programmable after production of an LSI and a reconfigurable processor in which the connection and the setting of a circuit cell inside the LSI are reconfigurable may be used. Further, if a technique of integrated circuit implementation which replaces the LSI by advancement of semiconductor technique or another technique derived therefrom is developed, naturally, the function blocks may be integrated by using the technique.

INDUSTRIAL APPLICABILITY

The display control device according to the present invention is applied to a display apparatus which is capable of switching a display on a display device to a display desired by a user, without a complicated operation, in a state where it is possible for the user to know a display state after switching at a glance and which is capable of displaying multiple windows, and the like.

The invention claimed is:

1. A display control device including a non-transitory computer-readable storage medium having a program stored thereon, the program causing a plurality of screens to be hierarchically displayed on a display device by controlling the display device, and the program being executed by the display control device, wherein the display control device further comprises:
an update request section which, when the program is executed by the display control device, makes an update request to update a display on the display device;
a display update section which, when the program is executed by the display control device, updates the display on the display device in response to receiving the update request from the update request section;
a layout holding section which, when the program is executed by the display control device, holds layout information of each screen of the plurality of screens hierarchically displayed on the display device after the display update section processes the update request;
a display state determination section which, when the program is executed by the display control device, refers to the layout information of each of the plurality of screens, and determines whether each respective screen of the plurality of screens is one of (i) a screen displayed on the display device, so as to be partially or entirely visible and (ii) a screen fully covered by another screen of the plurality of screens, so as to be invisible;
a group assigning section which, when the program is executed by the display control device, assigns only screens, of the plurality of screens, which are simultaneously displayed on the display device so as to be partially or entirely visible, to one group based on a result of the determination by the display state determination section;
a group holding section which, when the program is executed by the display control device, holds group information indicating a correspondence between the one group and the screens assigned to the one group by the group assigning section; and
a switching request section which, when the program is executed by the display control device, makes a list display request to display a switching destination screen candidate list showing the screens, which are indicated by the group information held in the group holding section, as switching destination screen candidates in a grouped unit, on the display device so as to be visible, wherein, in response to the list display request from the switching request section, the display update section further updates the display on the display device in accordance with the group information held in the group holding section, such that the switching destination screen candidate list is displayed on the display device so as to be visible, and wherein, each time the display update section processes the update request, the layout holding section holds the layout information of each of the plurality of screens hierarchically displayed on the display device.

2. The display control device according to claim 1,
wherein the switching destination screen candidate list shows the screens, which are indicated by the group information held in the group holding section, so as to be selectable as the switching destination screen candidates in a group unit,
wherein the display control device further comprises a layout update section for, when the one group is selected on the switching destination screen candidate list in accordance with a user's operation, updating the layout information held in the layout holding section, such that all screens, which belong to the one group, are to be displayed on the display device so as to be visible, and
wherein, in response to the updating of the layout information performed by the layout update section, the display update section further updates the display on the display device in accordance with the layout information, which has been updated by the layout update section.

3. The display control device according to claim 1,
wherein the switching destination screen candidate list shows the screens, which are indicated by the group information held in the group holding section, so as to be selectable as the switching destination screen candidates in a screen unit,
wherein the display control device further comprises a layout update section for, when one screen is selected on the switching destination screen candidate list in accordance with a user's operation, updating the layout information held in the layout holding section, such that the one screen is to be displayed in a foreground of the display device so as to be visible, and
wherein, in response to the updating of the layout information, the display update section further updates the display on the display device in accordance with the layout information, which has been updated by the layout update section.

4. The display control device according to claim 3, wherein the layout update section updates the layout information, such that the one screen is to be displayed in the foreground of and across an entire display area of the display device.

5. The display control device according to claim 4, further comprising a group update section for referring to the layout information updated by the layout update section, assigning screens, which are to be displayed on the display device so as to be partially or entirely visible, to the one group, and updating the group information in the group holding section based on the one group to which the screens are assigned by the group update section.

6. The display control device according to claim 1, further comprising a group addition section which, when the program is executed by the display control device, refers to the layout information of each of the plurality of screens held in the layout holding section, assigns, to another group, each combination of screens, of the plurality of screens, which (i) is different from the screens assigned to one group by the group assigning section, and (ii) is capable of being displayed on the display device without screen overlap, and adds other group information, consisting of the assigned another group to the group information held in the group holding section.

7. A non-transitory computer-readable recording medium having a program recorded thereon, the program being executed by a display control device capable of causing a plurality of screens to be hierarchically displayed on a display device by controlling the display device, the program causing the display control device to execute a display control method comprising:

an update request step of making an update request to update a display on the display device;

a first display update step of updating the display on the display device in response to receiving the update request made by the update request step;

a layout holding step of causing the display control device to hold layout information of each screen of the plurality of screens hierarchically displayed on the display device after the first display update step processes the update request;

a display state determination step of referring to the layout information of each of the plurality of screens, and determining whether each respective screen of the plurality of screens is one of (i) a screen displayed on the display device, so as to be partially or entirely visible and (ii) a screen fully covered by another screen of the plurality of screens, so as to be invisible;

a group assigning step of assigning only screens, of the plurality of screens, which are simultaneously displayed on the display device so as to be partially or entirely visible, to one group based on a result of the determination performed by the display state determination step;

a group holding step of causing the display control device to hold group information indicating a correspondence between the one group and the screens assigned to the one group by the group assigning step;

a switching request step of making a list display request to display a switching destination screen candidate list showing the screens, which are indicated by the group information held in the display control device, as switching destination screen candidates in a grouped unit, on the display device so as to be visible; and a second display update step of, in response to the list display request from the switching request step, updating the display on the display device using the group information held in the display control device, such that the switching destination screen candidate list is displayed on the display device so as to be visible, wherein, each time the first display update step processes the update request, the layout holding step holds the layout information of each of the plurality of screens hierarchically displayed on the display device.

8. An integrated circuit capable of causing a plurality of screens to be hierarchically displayed on a display device by controlling the display device, the integrated circuit comprising:

an update request section for making an update request to update a display on the display device;

a display update section for updating the display on the display device in response to receiving the update request from the update request section;

a layout holding section for holding layout information of each screen of the plurality of screens hierarchically displayed on the display device after the display update section processes the update request;

a display state determination section for referring to the layout information of each of the plurality of screens, and determining whether each respective screen of the plurality of screens is one of (i) a screen displayed on the display device, so as to be partially or entirely visible and (ii) a screen fully covered by another screen of the plurality of screens, so as to be invisible;

a group assigning section for assigning only screens, of the plurality of screens, which are simultaneously displayed on the display device so as to be partially or entirely visible, to one group based on a result of the determination by the display state determination section;

a group holding section for holding group information indicating a correspondence between the one group and the screens assigned to the one group by the group assigning section; and a switching request section for making a list display request to display a switching destination screen candidate list showing the screens, which are indicated by the group information held in the group holding section, as switching destination screen candidates in a grouped unit, on the display device so as to be visible;

wherein, in response to the list display request from the switching request section, the display update section further updates the display on the display device in accordance with the group information held in the group holding section, such that the switching destination screen candidate list is displayed on the display device so as to be visible, and wherein, each time the display update section processes the update request, the layout holding section holds the layout information of each of the plurality of screens hierarchically displayed on the display device.

\* \* \* \* \*